United States Patent
Kosai et al.

(10) Patent No.: US 9,300,554 B1
(45) Date of Patent: Mar. 29, 2016

(54) HEURISTICS FOR DETERMINING THE LAYOUT OF A PROCEDURALLY GENERATED USER INTERFACE

(71) Applicant: ExtraHop Networks, Inc., Seattle, WA (US)

(72) Inventors: Ryan Takeo Kosai, Seattle, WA (US); Alexander Clarke Birmingham, Kirkland, WA (US)

(73) Assignee: ExtraHop Networks, Inc., Seattle, WA (US)

( * ) Notice: Subject to any disclaimer, the term of this patent is extended or adjusted under 35 U.S.C. 154(b) by 0 days.

(21) Appl. No.: 14/750,905

(22) Filed: Jun. 25, 2015

(51) Int. Cl.
*H04L 12/26* (2006.01)

(52) U.S. Cl.
CPC .............. *H04L 43/045* (2013.01); *H04L 43/18* (2013.01)

(58) Field of Classification Search
CPC ............................... H04L 43/045; H04L 43/18
See application file for complete search history.

(56) References Cited

U.S. PATENT DOCUMENTS

| | | | |
|---|---|---|---|
| 5,715,464 A | 2/1998 | Crump et al. |
| 5,857,188 A | 1/1999 | Douglas |
| 5,928,363 A | 7/1999 | Ruvolo |
| 6,263,049 B1 | 7/2001 | Kuhn |
| 6,321,338 B1 | 11/2001 | Porras et al. |
| 6,385,729 B1 | 5/2002 | DiGiorgio et al. |
| 6,405,250 B1 | 6/2002 | Lin et al. |
| 6,412,000 B1 | 6/2002 | Riddle et al. |
| 6,526,044 B1 | 2/2003 | Cookmeyer, II et al. |
| 6,560,636 B2 | 5/2003 | Cohen et al. |
| 6,704,311 B1 | 3/2004 | Chuah et al. |
| 6,807,565 B1 | 10/2004 | Dodrill et al. |
| 6,883,015 B1 | 4/2005 | Geen et al. |
| 6,901,517 B1 | 5/2005 | Redmore |
| 6,944,599 B1 | 9/2005 | Vogel et al. |
| 6,999,729 B2 | 2/2006 | Wandel |
| 7,042,888 B2 | 5/2006 | Berggreen |
| 7,133,365 B2 | 11/2006 | Klinker et al. |
| 7,143,153 B1 | 11/2006 | Black et al. |
| 7,177,930 B1 | 2/2007 | LoPresti |
| 7,181,769 B1 | 2/2007 | Keanini et al. |

(Continued)

OTHER PUBLICATIONS

Official Communication for U.S. Appl. No. 12/326,672 mailed on Jun. 9, 2010 (9 pages).

(Continued)

*Primary Examiner* — Jianye Wu
(74) *Attorney, Agent, or Firm* — John W. Branch; Lowe Graham Jones PLLC

(57) ABSTRACT

Embodiments are directed to monitoring communication over a network using a network monitoring device (NMD). Measurement information may be generated based on network traffic that may be monitored by the NMD. Metrics associated with one or more characteristics of the monitored network traffic may be generated based on the measurement information. Layout information for a user-interface may be generated based on results of heuristics that use the measurement information. Generating the layout information may include, determining a layout template based on the results of the heuristics and the measurement information. Metric visualizations that may be associated with the metrics may be displayed in the user-interface based on the layout information. If measurements exceed defined threshold values, the layout information may be modified based on the changes to the measurement information. Accordingly, the layout of the user interface may be modified based on the modified layout information.

30 Claims, 10 Drawing Sheets

(56) References Cited

U.S. PATENT DOCUMENTS

| | | | |
|---|---|---|---|
| 7,474,654 | B2 | 1/2009 | Guru |
| 7,535,906 | B2 | 5/2009 | Engbersen et al. |
| 7,580,356 | B1 | 8/2009 | Mishra et al. |
| 7,594,273 | B2 | 9/2009 | Keanini et al. |
| 7,606,706 | B1 | 10/2009 | Rubin et al. |
| 7,609,630 | B2 | 10/2009 | Gobeil |
| 7,639,613 | B1 | 12/2009 | Ghannadian et al. |
| 7,644,150 | B1 | 1/2010 | Nucci et al. |
| 7,660,883 | B2 | 2/2010 | Fowlow |
| 7,774,456 | B1 | 8/2010 | Lownsbrough et al. |
| 7,916,652 | B1 | 3/2011 | Lima et al. |
| 2002/0023080 | A1 | 2/2002 | Uga et al. |
| 2002/0035604 | A1 | 3/2002 | Cohen et al. |
| 2002/0055998 | A1 | 5/2002 | Riddle et al. |
| 2002/0065912 | A1 | 5/2002 | Catchpole et al. |
| 2002/0078382 | A1 | 6/2002 | Sheikh et al. |
| 2002/0107953 | A1 | 8/2002 | Ontiveros et al. |
| 2002/0133586 | A1 | 9/2002 | Shanklin et al. |
| 2002/0152209 | A1 | 10/2002 | Merugu et al. |
| 2003/0131116 | A1 | 7/2003 | Jain et al. |
| 2003/0135667 | A1 | 7/2003 | Mann et al. |
| 2003/0149887 | A1 | 8/2003 | Yadav |
| 2003/0212900 | A1 | 11/2003 | Liu et al. |
| 2003/0233361 | A1 | 12/2003 | Cady |
| 2004/0093414 | A1 | 5/2004 | Orton |
| 2004/0146006 | A1 | 7/2004 | Jackson |
| 2004/0162070 | A1 | 8/2004 | Baral et al. |
| 2004/0199630 | A1 | 10/2004 | Sarkissian et al. |
| 2005/0015455 | A1 | 1/2005 | Liu |
| 2005/0066196 | A1 | 3/2005 | Yagi |
| 2005/0086255 | A1 | 4/2005 | Schran et al. |
| 2005/0125553 | A1 | 6/2005 | Wu et al. |
| 2005/0201363 | A1 | 9/2005 | Gilchrist et al. |
| 2005/0234920 | A1 | 10/2005 | Rhodes |
| 2005/0251009 | A1 | 11/2005 | Morita et al. |
| 2006/0045016 | A1 | 3/2006 | Dawdy et al. |
| 2006/0101068 | A1* | 5/2006 | Stuhec .................. G06F 17/212 |
| 2006/0174343 | A1 | 8/2006 | Duthie et al. |
| 2006/0184535 | A1 | 8/2006 | Kaluskar et al. |
| 2006/0230456 | A1 | 10/2006 | Nagabhushan et al. |
| 2006/0233349 | A1* | 10/2006 | Cooper ............... H04M 3/5175 379/265.06 |
| 2007/0039051 | A1 | 2/2007 | Duthie et al. |
| 2007/0067841 | A1 | 3/2007 | Yegneswaran et al. |
| 2007/0077931 | A1 | 4/2007 | Glinka |
| 2007/0143852 | A1 | 6/2007 | Keanini et al. |
| 2007/0153689 | A1 | 7/2007 | Strub et al. |
| 2007/0156886 | A1 | 7/2007 | Srivastava |
| 2007/0157306 | A1 | 7/2007 | Elrod et al. |
| 2007/0188494 | A1* | 8/2007 | Agutter ............. G06F 17/30554 345/440 |
| 2007/0239639 | A1 | 10/2007 | Loughmiller et al. |
| 2007/0256122 | A1 | 11/2007 | Foo et al. |
| 2008/0022401 | A1 | 1/2008 | Cameron et al. |
| 2008/0031141 | A1 | 2/2008 | Lean et al. |
| 2008/0034424 | A1 | 2/2008 | Overcash et al. |
| 2008/0034425 | A1 | 2/2008 | Overcash et al. |
| 2008/0059582 | A1 | 3/2008 | Hartikainen et al. |
| 2008/0147818 | A1 | 6/2008 | Sabo |
| 2008/0212586 | A1 | 9/2008 | Wang et al. |
| 2008/0219261 | A1 | 9/2008 | Lin et al. |
| 2008/0232359 | A1 | 9/2008 | Kim et al. |
| 2009/0010259 | A1 | 1/2009 | Sirotkin |
| 2009/0034426 | A1 | 2/2009 | Luft et al. |
| 2009/0168657 | A1 | 7/2009 | Puri et al. |
| 2009/0271469 | A1* | 10/2009 | Benco ................ H04N 21/8146 709/201 |
| 2009/0316602 | A1* | 12/2009 | Nandy ................... H04L 45/02 370/254 |
| 2010/0201573 | A1* | 8/2010 | Lamming ............ G01S 5/0289 342/451 |

OTHER PUBLICATIONS

Official Communication for U.S. Appl. No. 12/326,672 mailed on Dec. 23, 2010 (15 pages).

Official Communication for U.S. Appl. No. 12/326,672 mailed on Jun. 22, 2011 (16 pages).

Official Communication for U.S. Appl. No. 12/326,672 mailed on Oct. 24, 2011 (9 pages).

Lin, Mark, "An Overview of Session Hijacking at the Network and Application Levels," Jan. 18, 2005 (16 pages).

U.S. Appl. No. 11/683,643, entitled "Detecting Anomalous Network Application Behavior", by Jesse Abraham Rothstein and Arindum Mukerji, filed on Mar. 8, 2007 (40 pages).

U.S. Appl. No. 11/679,356, entitled "Capture and Resumption of Network Application Sessions", by Jesse Abraham Rothstein and Arindum Mukerji, filed on Feb. 27, 2007 (37 pages).

Official Communication for U.S. Appl. No. 11/683,643 mailed on Apr. 28, 2010 (35 pages).

Official Communication for U.S. Appl. No. 11/683,643 mailed on Oct. 14, 2010 (43 pages).

Official Communication for U.S. Appl. No. 11/683,643 mailed on Aug. 25, 2011 (43 pages).

Official Communication for U.S. Appl. No. 11/683,643 mailed on Jan. 23, 2012 (6 pages).

\* cited by examiner

HEURISTICS FOR DETERMINING THE LAYOUT OF A PROCEDURALLY GENERATED USER INTERFACE

TECHNICAL FIELD

The present invention relates generally to network monitoring, and more particularly, but not exclusively, to visualization of network monitoring metrics.

BACKGROUND

On most computer networks, bits of data arranged in bytes are packaged into collections of bytes called packets. These packets are generally communicated between computing devices over networks in a wired and/or wireless manner. A suite of communication protocols is typically employed to communicate between at least two endpoints over one or more networks. The protocols are typically layered on top of one another to form a protocol stack. One model for a network communication protocol stack is the Open Systems Interconnection (OSI) model, which defines seven layers of different protocols that cooperatively enable communication over a network. The OSI model layers are arranged in the following order: Physical (1), Data Link (2), Network (3), Transport (4), Session (5), Presentation (6), and Application (7).

Another model for a network communication protocol stack is the Internet Protocol (IP) model, which is also known as the Transmission Control Protocol/Internet Protocol (TCP/IP) model. The TCP/IP model is similar to the OSI model except that it defines four layers instead of seven. The TCP/IP model's four layers for network communication protocol are arranged in the following order: Link (1), Internet (2), Transport (3), and Application (4). To reduce the number of layers from four to seven, the TCP/IP model collapses the OSI model's Application, Presentation, and Session layers into its Application layer. Also, the OSI's Physical layer is either assumed or is collapsed into the TCP/IP model's Link layer. Although some communication protocols may be listed at different numbered or named layers of the TCP/IP model versus the OSI model, both of these models describe stacks that include basically the same protocols. For example, the TCP protocol is listed on the fourth layer of the OSI model and on the third layer of the TCP/IP model. To assess and troubleshoot communicated packets and protocols over a network, different types of network monitors can be employed. One type of network monitor, a "packet sniffer" may be employed to generally monitor and record packets of data as they are communicated over a network. Some packet sniffers can display data included in each packet and provide statistics regarding a monitored stream of packets. Also, some types of network monitors are referred to as "protocol analyzers" in part because they can provide additional analysis of monitored and recorded packets regarding a type of network, communication protocol, or application.

Generally, packet sniffers and protocol analyzers passively monitor network traffic without participating in the communication protocols. In some instances, they receive a copy of each packet on a particular network segment or VLAN from one or more members of the network segment. They may receive these packet copies through a port mirror on a managed Ethernet switch, e.g., a Switched Port Analyzer (SPAN) port, or a Roving Analysis Port (RAP). Port mirroring enables analysis and debugging of network communications. Port mirroring can be performed for inbound or outbound traffic (or both) on single or multiple interfaces. In other instances, packet copies may be provided to the network monitors from a specialized network tap or from a software agent running on the client or server. In virtual environments, port mirroring may be performed on a virtual switch that is incorporated within the hypervisor.

In some instances, a proxy is actively arranged between two endpoints, such as a client device and a server device. The proxy intercepts each packet sent by each endpoint and optionally transforms and forwards the payload to the other endpoint. Proxies often enable a variety of additional services such as load balancing, caching, content filtering, and access control. In some instances, the proxy may operate as a network monitor. In other instances, the proxy may forward a copy of the packets to a separate network monitor.

Furthermore as information technology infrastructure becomes more complex and more dynamic it may be more difficult to determine and monitor which devices and applications may be operative on a network. Also, the complexity may make it difficult, especially in large networks, for determining dependencies among the network devices and applications that are operative on the networks. Accordingly it may difficult to provide visualizations enable observation of the performance and/or behavior of the networks. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Description of Various Embodiments, which is to be read in association with the accompanying drawings, wherein.

DETAILED DESCRIPTION OF THE EMBODIMENTS

Figure 1:
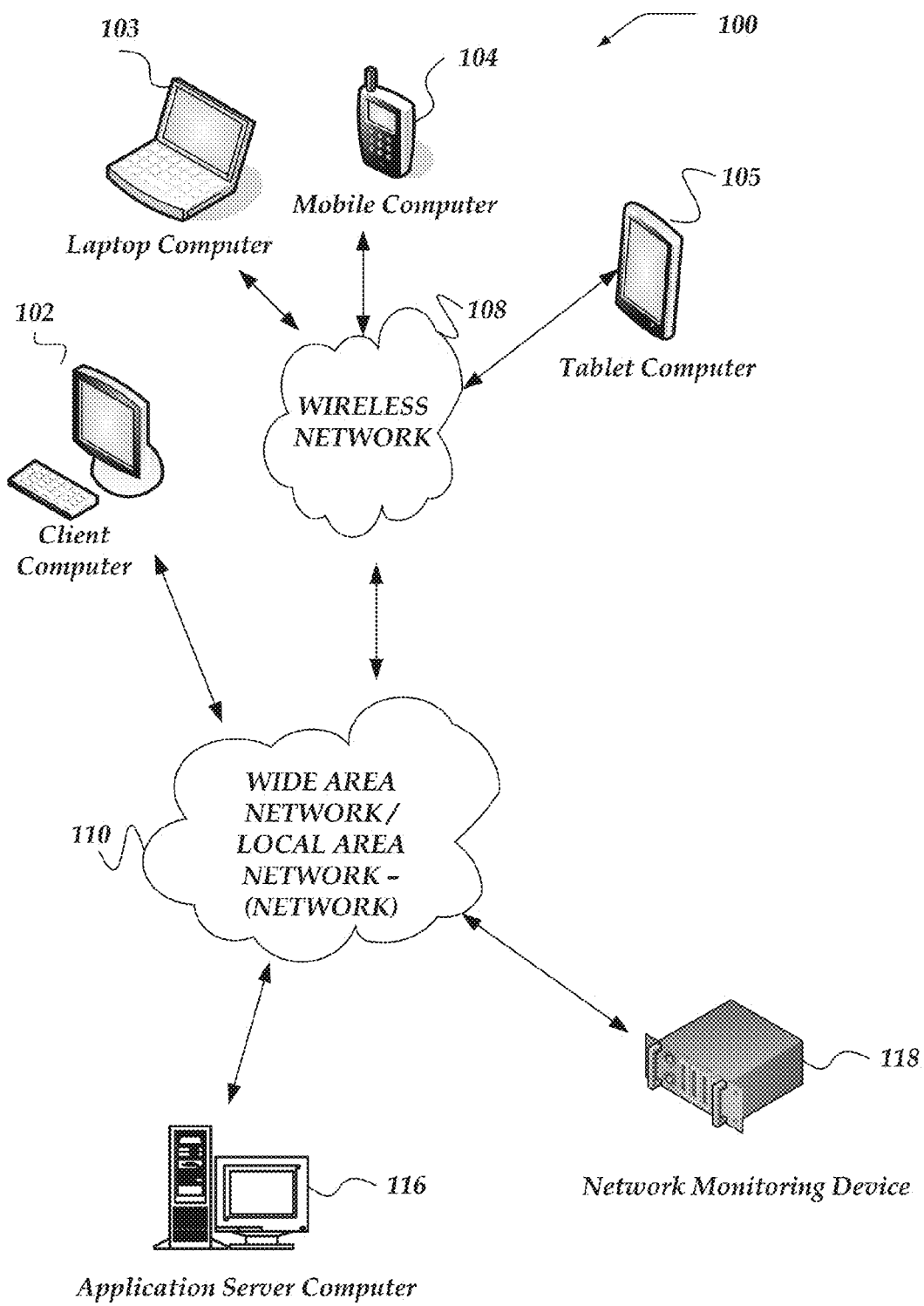
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein, the term "session" refers to a semi-permanent interactive packet interchange between two or more communicating endpoints, such as network devices. A session is set up or established at a certain point in time, and torn down at a later point in time. An established communication session may involve more than one message in each direction. A session may have stateful communication where at least one of the communicating network devices saves information about the session history to be able to communicate. A session may also provide stateless communication, where the communication consists of independent requests with responses between the endpoints. An established session is the basic requirement to perform a connection-oriented communication. A session also is the basic step to transmit in connectionless communication modes.

As used herein, the terms "network connection," and "connection" refer to communication sessions with a semi-permanent connection for interactive packet interchange between two or more communicating endpoints, such as network devices. The connection may be established before application data is transferred, and where a stream of data is delivered in the same or different order than it was sent. The alternative to connection-oriented transmission is connectionless communication. For example, the datagram mode of communication used by the Internet Protocol (IP) and the Universal Datagram Protocol (UDP) may deliver packets out of order, since different packets may be routed independently and could be delivered over different paths. Packets associated with a TCP protocol connection may also be routed independently and could be delivered over different paths. However, for TCP connections the network communication system may provide the packets to application endpoints in the correct order.

Connection-oriented communication may be a packet-mode virtual circuit connection. For example, a transport layer virtual circuit protocol such as the TCP protocol can deliver packets of data in order although the lower layer switching is connectionless. A connection-oriented transport layer protocol such as TCP can also provide connection-oriented communications over connectionless communication. For example, if TCP is based on a connectionless network layer protocol (such as IP), this TCP/IP protocol can then achieve in-order delivery of a byte stream of data, by means of segment sequence numbering on the sender side, packet buffering and data packet reordering on the receiver side. Alternatively, the virtual circuit connection may be established in a datalink layer or network layer switching mode, where all data packets belonging to the same traffic stream are delivered over the same path, and traffic flows are identified by some connection identifier rather than by complete routing information, which enables fast hardware based switching.

As used herein, the term "handshake" refers the data and messages exchanged between a client computer and server computer to establish secure communication channel. The particular secure communication protocol defines the handshake protocol that must be employed to establish a secure communication channel. In at least one of the various embodiments, the purpose of a handshake may be to enable the client and server to agree on one or more cryptographic features to employ, such as, authentication methods, key exchange methods, key sizes, cipher methods, or the like, or combination thereof.

As used herein, the terms "session flow" and "network flow" refer to one or more network packets or a stream of network packets that are communicated in a session that is established between at least two endpoints, such as two network devices. In at least one of the various embodiments, flows may be useful if one or more of the endpoints of a session may be behind a network traffic management device, such as a firewall, switch, router, load balancer, or the like. In at least one of the various embodiments, such flows may be used to ensure that the packets sent between the endpoints of a flow may be routed appropriately.

Typically, establishing a TCP based connection between endpoints begins with the execution of an initialization protocol and creates a single bi-directional flow between two endpoints, e.g., one direction of flow going from endpoint A to endpoint B, the other direction of the flow going from endpoint B to endpoint A, where each endpoint is at least identified by an IP address and a TCP port. In at least one of the various embodiments, a tuple may be employed to identify a flow. Also, other protocols may establish a separate flow for control information that enables management of at least one or more flows between two or more endpoints.

As used herein, the terms "network monitor", "network monitor device", or "NMD" refer to an application (software, hardware, or some combination) that is arranged to monitor and record flows of packets in a session that are communicated between at least two endpoints over at least one network. The NMD can provide information for assessing different aspects of these monitored flows. In at least one embodiment, the NMD passively monitors network packet traffic without participating in the communication protocols. This monitoring is performed for a variety of reasons, including troubleshooting and proactive remediation, end-user experience monitoring, SLA monitoring, capacity planning, application lifecycle management, infrastructure change management, infrastructure optimization, business intelligence, security, and regulatory compliance. The NMD can receive network communication for monitoring through a variety of means including network taps, wireless receivers, port mirrors or directed tunnels from network switches, clients or servers including the endpoints themselves, or other infrastructure devices. In at least some of the various embodiments, the NMD may receive a copy of each packet on a particular network segment or virtual local area network (VLAN). Also, for at least some of the various embodiments, they may receive these packet copies through a port mirror on a managed Ethernet switch, e.g., a Switched Port Analyzer (SPAN) port, or a Roving Analysis Port (RAP). Port mirroring enables analysis and debugging of network communications. Port mirroring can be performed for inbound or outbound traffic (or both) on single or multiple interfaces.

The NMD may track network connections from and to end points such as a client and/or a server. The NMD may also extract information from the packets including protocol information at various layers of the communication protocol stack. The NMD may reassemble or reconstruct the stream of data exchanged between the endpoints. The NMD may perform decryption of the payload at various layers of the protocol stack. The NMD may passively monitor the network traffic or it may participate in the protocols as a proxy. The NMD may attempt to classify the network traffic according to communication protocols that are used.

The NMD may also perform one or more actions for classifying protocols that may be a necessary precondition for application classification. While some protocols run on well-known ports, others do not. Thus, even if there is traffic on a well-known port, it is not necessarily the protocol generally understood to be assigned to that port. As a result, the NMD may perform protocol classification using one or more techniques, such as, signature matching, statistical analysis, traffic analysis, and other heuristics. In some cases, the NMD may use adaptive protocol classification techniques where information used to classify the protocols may be accumulated and/or applied over time to further classify the observed protocols. The NMD may categorize the traffic where categories might include file transfers, streaming audio, streaming video, database access, interactive, gaming, and the like. The NMD may attempt to determine whether the traffic corresponds to known communications protocols, such as HTTP, FTP, SMTP, RTP, TDS, TCP, IP, and the like.

As used herein the term "hardware security module" refers to a hardware device or computer arranged for providing additional safeguards for storing and using security/cryptographic information such as, keys, digital certificates, passwords, passphrases, two-factor authentication information, personal identification numbers, or the like. In some embodiments, hardware security modules may be employed to support one or more standard public key infrastructures, and may be employed to generate, manage, and/or store keys pairs, or the like. In some embodiments, hardware security modules may be arranged and/or configured as stand-alone network computers, in other cases, they may be arranged as hardware cards that may be added to a computer. Further, in some cases, hardware security modules may be arranged as a portable computer, and/or incorporated into client computers.

As used herein the term "dashboard" refers to a user interface that includes one or more visualizations of one or more metrics that may be associated with one or more monitored networks. The visualizations displayed in the dashboard user interface may be selected and/or organized (arranged) based on the results of one or more heuristics that may operate on measurement information collected from a monitor network and/or user metrics.

As used herein the term "layout information" refers to information that may be employed for determining how select and layout the visualizations that may be included in a dashboard user interface. In at least one of the various embodiments, layout information may include templates, ordered lists of visualizations, geometry information for positioning visualizations, or the like, or combination thereof.

As used herein the terms "measurements," "measurement information" refer to information collected by an NMD or application (e.g., dashboard application) that may be used for generating metric information and/or used for determining if a metric should be included in a dashboard user interface. Measurement information may include an indication of the presence of one or more patterns, such as, network packet headers, protocol preambles, or the like. In some cases, measurement information may be aggregated to generate a metric. In other cases, the measurement information may be used to determine dashboard user interface layout information.

As used herein the term "metric" refers to a value that represents one or more performance characteristics of a monitored network. Metrics may be include aggregated measurements, rate of changes, proportions, or the like, Metrics may be associated with particular network application, network protocols, or the like.

Metrics may include an indication of the presence of one or more patterns, such as, network packet headers, protocol preambles, or the like. Common metrics may include: requests and responses for Hypertext Transfer Protocol) HTTP; database protocols; Transport Security Layer/Secure Sockets Layer (TLS/SSL); storage protocols, such as, Common Internet File System (CIFS) or Network File System (NFS), Domain Name Service (DNS), Lightweight Directory Access Protocol (LDAP); NoSQL storage protocols such as MongoDB or Memcache, File Transfer Protocol (FTP), Simple Mail Transfer Protocol (SMTP); and Voice-over-IP (VoIP) protocols such as Session Initiation Protocol (SIP) and Real-time Transport Protocol (RTP); or the like.

Within each of metric, there may be measurements broken down by Response Status Codes (that may apply across many protocols, including HTTP, SMTP, SIP); HTTP Requests by Method (GET, POST, HEAD, or the like.); requests by SQL method and table, SSL certificate expiration time by host, various protocols by username (e.g., LDAP, FTP, SMTP, VoIP, or the like), and by client or server IP (almost every protocol). Also, in some embodiments, users may define "custom" metrics based on the collection of user-defined measurements for a given protocol.

As used herein the "metric visualization" refers to a graphical representation of a metric. A metric may be associated with one or more different types of visualizations. In some embodiments, metrics visualizations may be line graphs, pie charts, bar graphs, scatter plots, heat maps, Sankey diagrams, histograms, time series graphs, candlestick charts, geolocation charts, or the like, or combination thereof, display in a graphical user interface.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to monitoring communication over a network using a network monitoring device (NMD). In at least one of the various embodiments, measurement information may be generated based on network traffic that may be monitored by the NMD.

In at least one of the various embodiments, the measurement information, may include, user interactions with the user-interface, such as rearranging the layout of the metric visualizations, hiding the one or more metric visualizations from view, sharing the one or more metric visualizations with other users, printing hardcopies of the one or more metric visualizations, or the like. Also, in at least one of the various embodiments, the measurement information may include, one or more changes in a topology of the network, such as, one or more of one or more computers being added to the network, one or more computers leaving the network, alterations to the network's routing information, or the like, or combination thereof.

In at least one of the various embodiments, one or more metrics associated with one or more characteristics of the monitored network traffic may be generated based on the measurement information.

In at least one of the various embodiments, layout information for a user-interface, such as, a dashboard, may be generated based on results of one or more heuristics that use some or all of the measurement information. In at least one of the various embodiments, the results of the one or more heuristics may be generated by an expert system, a rules engine, a neural network, a deep learning neural network, a computer program, configuration information, or the like, or combination thereof.

In at least one of the various embodiments, generating the layout information may include, determining a layout template based on the results of the one or more heuristics and the measurement information. Also, in at least one of the various embodiments, generating the layout information may include employing geo-location information that may be provided to the one or more heuristics. In at least one of the various embodiments, one or more metric visualizations that may be associated with the one or more metrics may be displayed in the user-interface based on the layout information.

In at least one of the various embodiments, if measurements included in the measurement information exceed one or more defined threshold values, the layout information may be modified based on the changes to the measurement information and updated results that may be produced the one or more heuristics. Accordingly, the display layout of the metric visualizations in the dashboard user interface may be modified based on the modified layout information.

In at least one of the various embodiments, the measurement information may include characteristics of the network traffic that may be associated with different Open Systems Interconnection (OSI) model layers of the network traffic. In at least one of the various embodiments, the measurement information associated with the separate OSI layers may be provided to the one or more heuristics to determine one or more correlations between the different OSI layers based on the characteristics. Accordingly, the results of the heuristics may be updated based on the one or more correlations.

In at least one of the various embodiments, a position in the user interface (dashboard) for the one or more metric visualizations may be determined based on at least a relevancy score or a weight, such that the relevancy score is determined in part by the results of one or more heuristics.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)—(network) 110, wireless network 108, client computers 102-105, Application Server Computer 116, Network Monitoring Device 118, or the like.

At least one embodiment of client computers 102-105 is described in more detail below in conjunction with FIG. 2. In one embodiment, at least some of client computers 102-105 may operate over one or more wired and/or wireless networks, such as networks 108, and/or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CSS), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive and/or send content between another computer. The client application may include a capability to send and/or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, application server computer 116, and network monitoring device 118, or other computers.

Client computers 102-105 may further be configured to include a client application that enables an end-user to log into an end-user account that may be managed by another computer, such as application server computer 116, network monitoring device 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Further, client computers may be arranged to enable users to provide configuration information, or the like, to network monitoring device 118. Also, client computers may be arranged to enable users to display reports, interactive user-interfaces, and/or results provided by network monitor device 118.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, application server computer 116, network monitoring device 118, client computers 102-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

One embodiment of application server computer 116 is described in more detail below in conjunction with FIG. 3. Briefly, however, application server computer 116 includes virtually any network computer capable of hosting applications and/or providing services in network environment.

One embodiment of network monitoring device 118 is described in more detail below in conjunction with FIG. 3. Briefly, however, network monitoring device 116 includes virtually any network computer capable of passively monitoring communication traffic in a network environment.

Although FIG. 1 illustrates application server computer 116, and network monitor device 118, each as a single computer, the innovations and/or embodiments are not so limited. For example, one or more functions of application server computer 116, and/or network monitoring device 118, or the like, may be distributed across one or more distinct network computers. Moreover, in at least one embodiment, network monitoring device 118 may be implemented using a plurality of network computers. Further, in at least one of the various embodiments, application server computer 116, and/or network monitoring device 118 may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
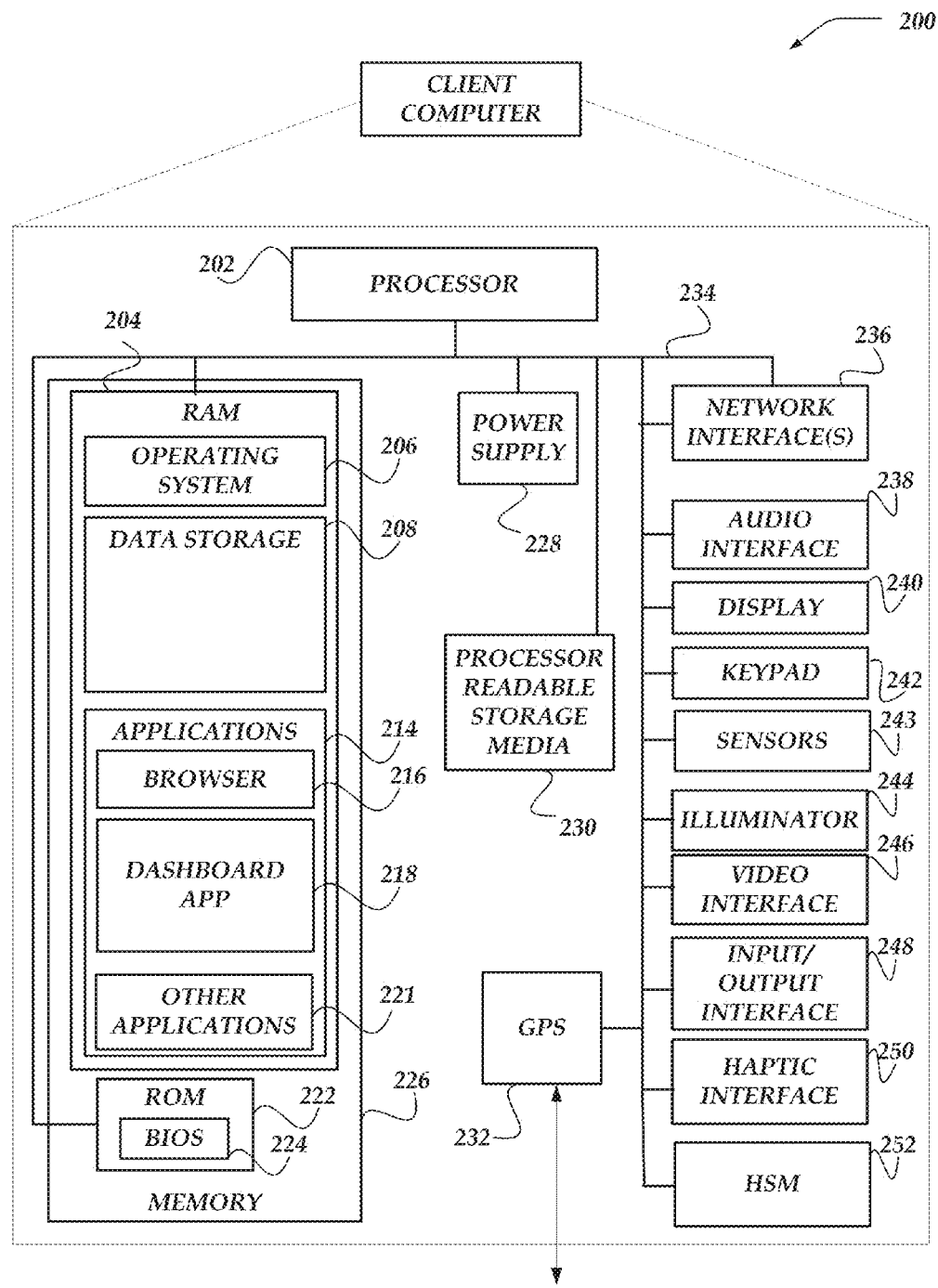
FIG. 2 shows a schematic embodiment of a client computer.

FIG. 2 shows one embodiment of client computer 200 that may be included in a system in accordance with at least one of the various embodiments. Client computer 200 may include many more or less components than those shown in FIG. 2.

However, the components shown are sufficient to disclose an illustrative embodiment for practicing the present invention. Client computer 200 may represent, for example, one embodiment of at least one of client computers 102-105 of FIG. 1.

As shown in the figure, client computer 200 includes a processor device, such as processor 202 in communication with a mass memory 226 via a bus 234. In some embodiments, processor 202 may include one or more central processing units (CPU) and/or one or more processing cores. Client computer 200 also includes a power supply 228, one or more network interfaces 236, an audio interface 238, a display 240, a keypad 242, an illuminator 244, a video interface 246, an input/output interface 248, a haptic interface 250, a global positioning system (GPS) receiver 232, and a hardware security module (HSM).

Power supply 228 provides power to client computer 200. A rechargeable or non-rechargeable battery may be used to provide power. The power may also be provided by an external power source, such as an alternating current (AC) adapter or a powered docking cradle that supplements and/or recharges a battery.

Client computer 200 may optionally communicate with a base station (not shown), or directly with another computer. Network interface 236 includes circuitry for coupling client computer 200 to one or more networks, and is constructed for use with one or more communication protocols and technologies including, but not limited to, GSM, CDMA, TDMA, GPRS, EDGE, WCDMA, HSDPA, LTE, user datagram protocol (UDP), transmission control protocol/Internet protocol (TCP/IP), short message service (SMS), WAP, ultra wide band (UWB), IEEE 802.16 Worldwide Interoperability for Microwave Access (WiMax), session initiated protocol/real-time transport protocol (SIP/RTP), or any of a variety of other wireless communication protocols. Network interface 236 is sometimes known as a transceiver, transceiving device, or network interface card (NIC).

Audio interface 238 is arranged to produce and receive audio signals such as the sound of a human voice. For example, audio interface 238 may be coupled to a speaker and microphone (not shown) to enable telecommunication with others and/or generate an audio acknowledgement for some action.

Display 240 may be a liquid crystal display (LCD), gas plasma, light emitting diode (LED), organic LED, or any other type of display used with a computer. Display 240 may also include a touch sensitive screen arranged to receive input from an object such as a stylus or a digit from a human hand.

Keypad 242 may comprise any input device arranged to receive input from a user. For example, keypad 242 may include a push button numeric dial, or a keyboard. Keypad 242 may also include command buttons that are associated with selecting and sending images.

Illuminator 244 may provide a status indication and/or provide light. Illuminator 244 may remain active for specific periods of time or in response to events. For example, when illuminator 244 is active, it may backlight the buttons on keypad 242 and stay on while the client computer is powered. Also, illuminator 244 may backlight these buttons in various patterns when particular actions are performed, such as dialing another client computer. Illuminator 244 may also cause light sources positioned within a transparent or translucent case of the client computer to illuminate in response to actions.

Video interface 246 is arranged to capture video images, such as a still photo, a video segment, an infrared video, or the like. For example, video interface 246 may be coupled to a digital video camera, a web-camera, or the like. Video interface 246 may comprise a lens, an image sensor, and other electronics. Image sensors may include a complementary metal-oxide-semiconductor (CMOS) integrated circuit, charge-coupled device (CCD), or any other integrated circuit for sensing light.

Client computer 200 also comprises input/output interface 248 for communicating with external devices, such as a headset, or other input or output devices not shown in FIG. 2. Input/output interface 248 can utilize one or more communication technologies, such as USB, infrared, Bluetooth™, or the like.

Haptic interface 250 is arranged to provide tactile feedback to a user of the client computer. For example, the haptic interface 250 may be employed to vibrate client computer 200 in a particular way when another user of a computer is calling. In some embodiments, haptic interface 250 may be optional.

Further, client computer 200 may also comprise hardware security module (HSM) 252 for providing additional tamper resistant safeguards for generating, storing and/or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, and/or store keys pairs, or the like. In some embodiments, HSM 252 may be a stand-alone computer, in other cases, HSM 252 may be arranged as a hardware card that may be added to a client computer.

Client computer 200 may also include GPS transceiver 232 to determine the physical coordinates of client computer 200 on the surface of the Earth. GPS transceiver 232, in some embodiments, may be optional. GPS transceiver 232 typically outputs a location as latitude and longitude values. However, GPS transceiver 232 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 232 can determine a physical location within millimeters for client computer 200; and in other cases, the determined physical location may be less precise, such as within a meter or significantly greater distances. In one embodiment, however, client computer 200 may through other components, provide other information that may be employed to determine a physical location of the computer, including for example, a Media Access Control (MAC) address, IP address, or the like.

Sensors 243 may include one or more sensors for monitoring/measuring one or more environmental and/or electrical conditions. Sensor 243 may include temperature sensors (internal and external), electrical current sensors, voltage sensors, accelerometers, or the like.

Mass memory 226 includes a Random Access Memory (RAM) 204, a Read-only Memory (ROM) 222, and other storage means. Mass memory 226 illustrates an example of computer readable storage media (devices) for storage of information such as computer readable instructions, data structures, program modules or other data. Mass memory 226 stores a basic input/output system (BIOS) 224, or the like, for controlling low-level operation of client computer 200. The mass memory also stores an operating system 206 for controlling the operation of client computer 200. It will be appreciated that this component may include a general-purpose operating system such as a version of UNIX, or Linux™, or a specialized client communication operating system such as Microsoft Corporation's Windows Mobile™, Apple Inc.'s iOS™, Google Corporation's Android™, or the like. The operating system may include, or interface with a Java virtual machine module that enables control of hardware components and/or operating system operations via Java application programs.

Mass memory 226 further includes one or more data storage 208, which can be utilized by client computer 200 to store, among other things, applications 214 and/or other data. For example, data storage 208 may also be employed to store information that describes various capabilities of client computer 200. The information may then be provided to another computer based on any of a variety of events, including being sent as part of a header during a communication, sent upon request, or the like. Data storage 208 may also be employed to store social networking information including address books, buddy lists, aliases, user profile information, user credentials, or the like. Further, data storage 208 may also store messages, web page content, or any of a variety of user generated content.

At least a portion of the information stored in data storage 208 may also be stored on another component of client computer 200, including, but not limited to processor readable storage media 230, a disk drive or other computer readable storage devices (not shown) within client computer 200.

Processor readable storage media 230 may include volatile, non-transitory, nonvolatile, removable, and non-removable media implemented in any method or technology for storage of information, such as computer- or processor-readable instructions, data structures, program modules, or other data. Examples of computer readable storage media include RAM, ROM, Electrically Erasable Programmable Read-only Memory (EEPROM), flash memory or other memory technology, Compact Disc Read-only Memory (CD-ROM), digital versatile disks (DVD) or other optical storage, magnetic cassettes, magnetic tape, magnetic disk storage or other magnetic storage devices, or any other physical medium which can be used to store the desired information and which can be accessed by a computer. Processor readable storage media 230 may also be referred to herein as computer readable storage media and/or computer readable storage device.

Applications 214 may include computer executable instructions which, when executed by client computer 200, transmit, receive, and/or otherwise process network data. Network data may include, but is not limited to, messages (e.g., SMS, Multimedia Message Service (MMS), instant message (IM), email, and/or other messages), audio, video, and enable telecommunication with another user of another computer. Applications 214 may include, for example, a browser 216, dashboard application 218, and other applications 221.

Browser 216 may include virtually any application configured to receive and display graphics, text, multimedia, messages, and the like, employing virtually any web based language. In one embodiment, the browser application is enabled to employ HDML, WML, WMLScript, JavaScript, SGML, HTML, HTML5, XML, and the like, to display and send a message. However, any of a variety of other web-based markup or programming languages may be employed. In one embodiment, browser 216 may enable a user of client computer 200 to communicate with another network computer, such as application server computer 116, and/or network monitoring device 118, or the like, as shown in FIG. 1.

Other applications 222 may include, but are not limited to, calendars, search programs, email clients, IM applications, SMS applications, voice over Internet Protocol (VOIP) applications, contact managers, task managers, transcoders, database programs, word processing programs, software development tools, security applications, spreadsheet programs, games, search programs, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), or the like, or combination thereof. The embedded logic hardware device may directly execute its embedded logic to perform actions. Also, in one or more embodiments (not shown in the figures), client computer 200 may include a hardware microcontroller instead of a CPU. In at least one embodiment, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

Illustrative Network Computer

Figure 3:
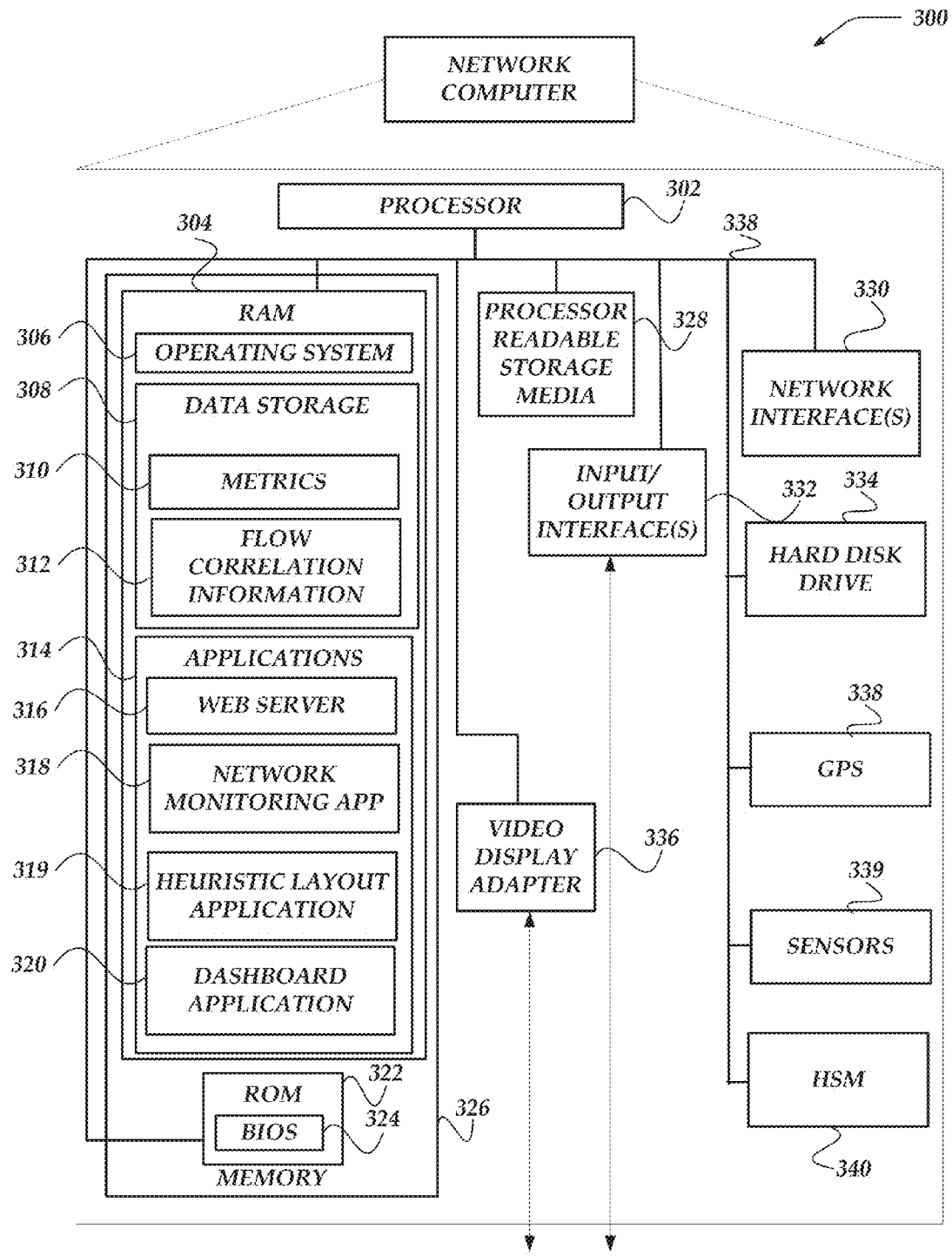
FIG. 3 illustrates a schematic embodiment of a network computer.

FIG. 3 shows one embodiment of a network computer 300, in accordance with at least one of the various embodiments. Network computer 300 may include many more or less components than those shown. The components shown, however, are sufficient to disclose an illustrative embodiment for practicing the invention. Network computer 300 may be configured to operate as a server, client, peer, a host, a cloud instance, a network monitoring device, a network hardware security module, or any other computer. Network computer 300 may represent, for example application server computer 116, network monitoring device 118, or the like.

Network computer 300 includes one or more processor devices, such as, processor 302. Also, network computer 300 includes processor readable storage media 328, network interface unit 330, an input/output interface 332, hard disk drive 334, video display adapter 336, hardware security module 340, and memory 326, all in communication with each other via bus 338.

As illustrated in FIG. 3, network computer 300 also can communicate with the Internet, or other communication networks, via network interface unit 330, which is constructed for use with various communication protocols including the TCP/IP protocol. Network interface unit 330 is sometimes known as a transceiver, transceiving device, or network interface card (NIC).

Network computer 300 also comprises input/output interface 332 for communicating with external devices, such as a keyboard, or other input or output devices not shown in FIG. 3. Input/output interface 332 can utilize one or more communication technologies, such as USB, infrared, NFC, Bluetooth™, or the like.

GPS transceiver 338 can determine the physical coordinates of network computer 300 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 338 can determine a physical location for network computer 300. In at least one embodiment, however, network computer 300 may, through other components, provide other information that may be employed to determine a physical location of the client computer, including for example, a Media Access Control (MAC) address, IP address, and the like.

Sensors 339 may include one or more sensors for monitoring/measuring one or more environmental and/or electrical conditions. Sensor 339 may include temperature sensors (internal and external), electrical current sensors, voltage sensors, accelerometers, or the like.

Memory 326 generally includes RAM 304, ROM 322 and one or more permanent mass storage devices, such as hard disk drive 334, tape drive, optical drive, and/or floppy disk drive. Memory 326 stores operating system 306 for controlling the operation of network computer 300. Any general-purpose operating system may be employed. Basic input/output system (BIOS) 324 is also provided for controlling the low-level operation of network computer 300.

Although illustrated separately, memory 326 may include processor readable storage media 328. Processor readable storage media 328 may be referred to and/or include computer readable media, computer readable storage media, and/or processor readable storage device. Processor readable storage media 328 may include volatile, nonvolatile, non-transitory, non-transitive, removable, and non-removable media implemented in any method or technology for storage of information, such as computer readable instructions, data structures, program modules, or other data. Examples of processor readable storage media include RAM, ROM, EEPROM, flash memory or other memory technology, CD-ROM, digital versatile disks (DVD) or other optical storage, solid state storage devices, magnetic cassettes, magnetic tape, magnetic disk storage or other magnetic storage devices, or any other media which can be used to store the desired information and which can be accessed by a computer.

Memory 326 further includes one or more data storage 308, which can be utilized by network computer 300 to store, among other things, applications 314 and/or other data. For example, data storage 308 may also be employed to store information that describes various capabilities of network computer 300. Also, data storage 308 may store metrics 310, flow correlation information 312, or the like. Metrics 310 may include performance information associated with network operations as well as user interactions. Flow correlation information 312 may include information used to correlation different network traffic flows to each other. The information may then be provided to another computer based on any of a variety of events, including being sent as part of a header during a communication, sent upon request, or the like. Data storage 308 may also be employed to store messages, web page content, or the like. At least a portion of the information may also be stored on another component of network computer 300, including, but not limited to processor readable storage media 328, hard disk drive 334, or other computer readable storage medias (not shown) within network computer 300.

Data storage 308 may include a database, text, spreadsheet, folder, file, or the like, that may be configured to maintain and store user account identifiers, user profiles, email addresses, IM addresses, and/or other network addresses; or the like. Data storage 308 may further include program code, data, algorithms, and the like, for use by a processor device, such as processor 302 to execute and perform actions. In one embodiment, at least some of data store 308 might also be stored on another component of network computer 300, including, but not limited to processor-readable storage media 328, hard disk drive 334, or the like.

Applications 314 may include computer executable instructions, which may be loaded into mass memory and run on operating system 306. Examples of application programs may include transcoders, schedulers, calendars, database programs, word processing programs, Hypertext Transfer Protocol (HTTP) programs, customizable user-interface programs, IPSec applications, encryption programs, security programs, SMS message servers, IM message servers, email servers, account managers, and so forth. Applications 314 may also include, web server 316, network monitoring application 318, heuristic layout application 319, dashboard application 320, or the like.

Web server 316 may represent any of a variety of information and services that are configured to provide content, including messages, over a network to another computer. Thus, website server 316 can include, for example, a web server, a File Transfer Protocol (FTP) server, a database server, a content server, email server, or the like. Website server 316 may provide the content including messages over the network using any of a variety of formats including, but not limited to WAP, HDML, WML, SGML, HTML5, XML, Compact HTML (C-HTML), Extensible HTML (XHTML), or the like.

Further, network computer 300 may also comprise hardware security module (HSM) 340 for providing additional tamper resistant safeguards for generating, storing and/or using security/cryptographic information such as, keys, digital certificates, passwords, passphrases, two-factor authentication information, or the like. In some embodiments, hardware security module may be employ to support one or more standard public key infrastructures (PKI), and may be employed to generate, manage, and/or store keys pairs, or the like. In some embodiments, HSM 340 may be a stand-alone network computer, in other cases, HSM 340 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), or the like, or combination thereof. The embedded logic hardware device may directly execute its embedded logic to perform actions. Also, in one or more embodiments (not shown in the figures), network computer 300 may include a hardware microcontroller instead of a CPU. In at least one embodiment, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

Illustrative Logical System Architecture

Figure 4:
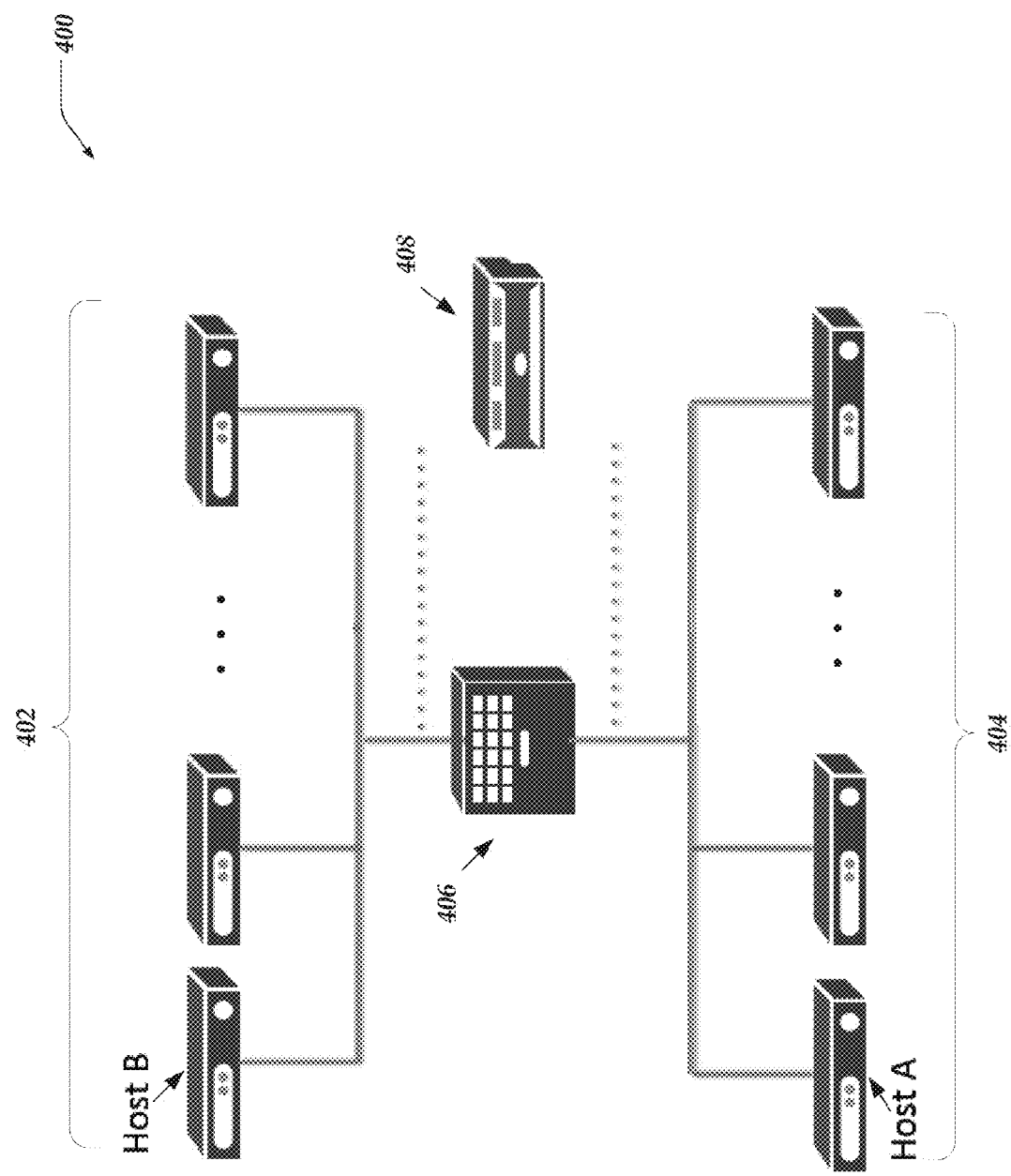
FIG. 4 illustrates a logical architecture of a system for secure communication secret sharing in accordance with at least one of the various embodiments.

FIG. 4 illustrates a logical architecture of system 400 for heuristics for determining the layout of a procedurally generated user interface in accordance with at least one of the various embodiments. System 400 may be arranged to include a plurality of network devices and/or network computers on first network 402 and a plurality of network devices and/or network computers on second network 404. Communication between the first network and the second network may be managed by a switch, such as, switch 406. Also, NMD 408 may be arranged to passively monitor and/or record packets (network packets) that are communicated in network connection flows between a network devices on first network 402 and second network 404. For example, the communication of flows of packets between the Host B network device and the Host A network device are managed by switch 406 and NMD 408 may be passively monitoring and recording some or all of the network traffic comprising these flows. In at least one of the various embodiments, NMD 408 may be arranged to generate one or more metric based on the monitored network traffic.

NMD 408 may be arranged to receive network communication for monitoring through a variety of means including network taps, wireless receivers, port mirrors or directed tunnels from network switches, clients or servers including the endpoints themselves, or other infrastructure devices. In at least some of the various embodiments, the NMD may receive a copy of each packet on a particular network segment or virtual local area network (VLAN). Also, for at least some of the various embodiments, NMDs may receive these packet copies through a port mirror on a managed Ethernet switch, e.g., a Switched Port Analyzer (SPAN) port, or a Roving Analysis Port (RAP). Port mirroring enables analysis and debugging of network communications. Port mirroring can be performed for inbound or outbound traffic (or both) on single or multiple interfaces.

In at least one of the various embodiments, NMD 408 may monitor network traffic using deep packet inspection which enables the NMD 408 to observe characteristics of the different layers of the network traffic. Also, NMD 408 may be arranged to accumulate flow correlation information that may be employed to associate one or more network traffic flows with each other and/or with various metrics. In at least one of the various embodiments, NMD 408 may be arranged to employ rule based configuration information that may determine the metrics that should be collected. Also, NMD 408 may provide facilities that enable users and/or configuration information to define one or more triggers, threshold values, or the like, that may be associated with one or more of the metrics.

Figure 5:
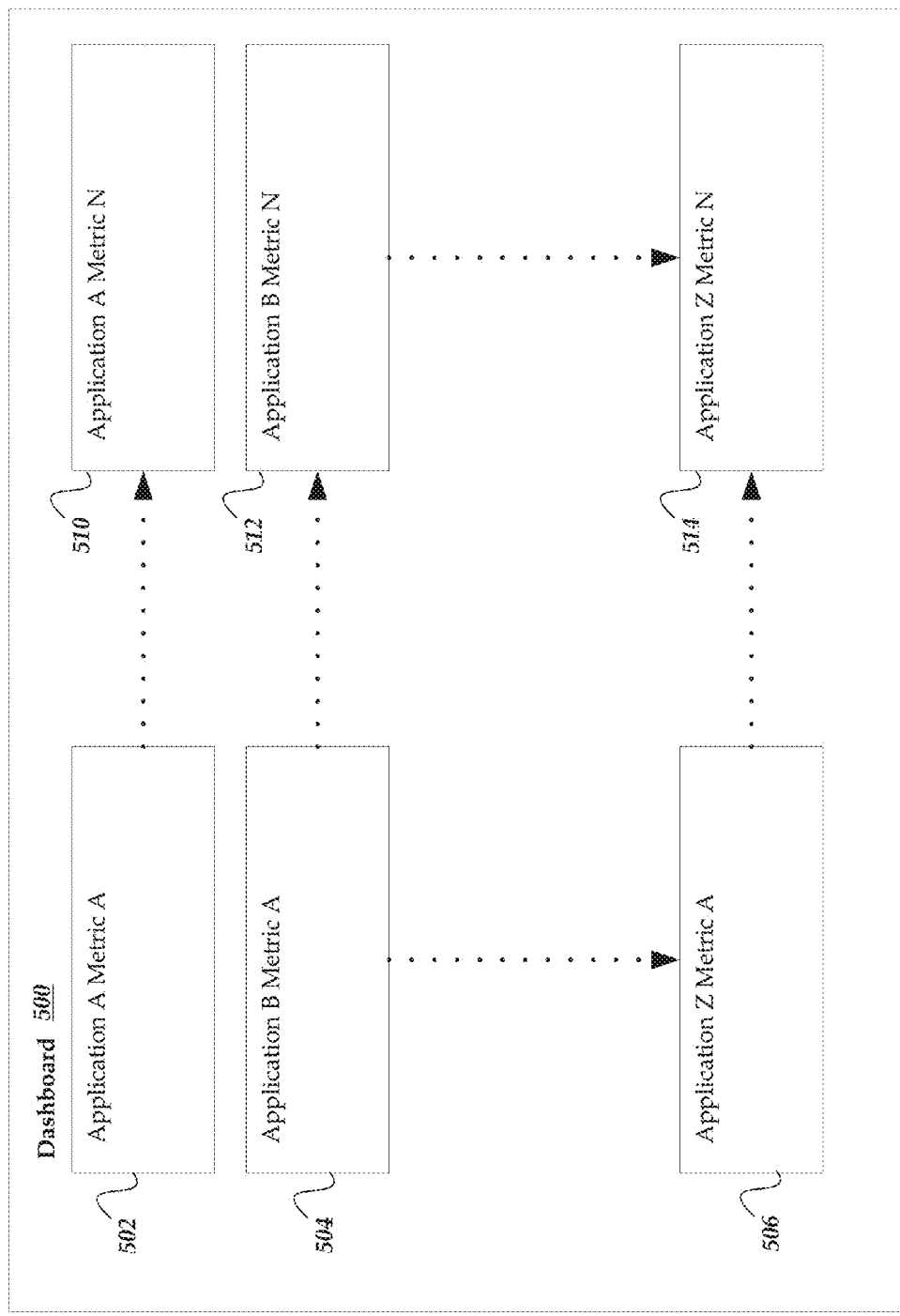
FIG. 5 illustrates a logical dashboard layout in accordance with at least one of the various embodiments.

FIG. 5 illustrates a stylized/logical layout of dashboard 500 that is in accordance with at least one of the various embodiments. In at least one of the various embodiments, dashboard 500 may represent a user-interface that may display one or more visualization of various metrics that may be associated with monitored network. The visualizations presented in dashboard 500 may be associated with metrics for one or more networks. Further, the displayed visualizations may be selected and/or ordered based on layout information that may be dynamically generated based on one or more network metrics and/or user interactions.

In this stylized example, visualization that are associate with different application are presented. The applications are ordered top to bottom with different metric visualizations for a given application order left to right. Accordingly, visualization 502 represents a visualization of metric A for Application A; and visualization 510 represents a visualization of metric N for Application A. Likewise, in this stylized example, visualization 504 represents a visualization of metric A for Application B; visualization 512 represents a visualization of metric N for Application B; visualization 506 represents a visualization of metric A for Application Z; and visualization 514 represents a visualization of metric N for Application Z.

In at least one of the various embodiments, applications may represent network traffic for well-known network applications, such as, web traffic (HTTP/HTTPS), email activity (SMTP, POP, IMAP, or the like), database activity, storage activity, or the like. Also, in3database activity, storage activity, one or more custom application metrics, or the like, or combination thereof. Also, in, or combination thereof. Also, in at least one of the various embodiments, each application may have one or more different metrics that may be presented in one or more visualizations. In some cases, application may have similar metrics types, such as, number of connections, packets/bytes per sec, or the like. In other cases, applications may have metrics that may be unique to them. For example, metrics for database applications may include database transactions, queries, updates, inserts storage quotas, or the like. Also for example, metrics, for a web server application may include connections per second, HTTP response code visualizations, or the like.

In at least one of the various embodiments, the selection and layout of the visualizations in a dashboard may be dynamically selected based on various heuristics described in detail below. Further, in at least one of the various embodiments, the visualizations presented in dashboard 500 may be tailored for particular users and/or user roles, applications, or the like.

In at least one of the various embodiments, various layout strategies may be employed depending on the template that is selected. For example, dashboard 500 is organized to orient applications from top to bottom and metrics associates with the applications from left to right. In other words, the metric visualizations may be grouped in rows by application. One of ordinary skill in the art will appreciate that other layout strategies may be employed. For example, visualization metrics may be grouped by applications column-wise (not shown FIG. 5).

In at least one of the various embodiments, the visualization metrics may be arranged based on a determined relevance score. In at least one of the various embodiments, metrics having the highest score may have their associated visualizations positioned in the most prominent position on the dashboard. For example, dashboard 500 may position metric visualization 502 in the upper left corner because it has the highest relevance score. Likewise, in this example, metric visualization 514 may represent a metric visualization having the lowest relevance score displayed in dashboard 500. Other dashboard layout schemes may position metric visualization differently based on the priorities of the user or other administrators.

In at least one of the various embodiments, the relevance score of a metric, described in more detail below, may be dynamically modified/updated based on one or more network traffic characteristics, network performance, configuration (weighting) changes, or the like. Accordingly, the display position of a given metric visualization may dynamically change based on the current relevance scores.

In at least one of the various embodiments, there may be more visualizations available than can be positioned in a dashboard. Accordingly, the relevance scores for metrics may be employed to determine the visualization metrics that may be displayed on a dashboard. In at least one of the various embodiments, two or more metrics and/or metric visualization may be bound together such that if a visualization of one metric is displayed visualizations for the one or more bound metrics are also displayed on the dashboard. In at least one of the various embodiments, configuration information or rule based policies may be arranged to enforce such associations. In some embodiments, metrics that are grouped together may automatically receive a relevance score increase (bump) if one or more of the group's member has a relevance score that indicates that it should be positioned on the dashboard.

Generalized Operations

FIGS. 6-10 represent the generalized operation for heuristics for determining the layout of a procedurally generated user interface in accordance with at least one of the various embodiments. In at least one of the various embodiments, processes 600, 700, 800, 900, and 1000 described in conjunction with FIGS. 6-10 may be implemented by and/or executed on a single network computer (or network monitoring device), such as network computer 300 of FIG. 3. In other embodiments, these processes, or portions thereof, may be implemented by and/or executed on a plurality of network computers, such as network computer 300 of FIG. 3. In yet other embodiments, these processes, or portions thereof, may be implemented by and/or executed on one or more virtualized computers, such as, those in a cloud-based environment. However, embodiments are not so limited and various combinations of network computers, client computers, or the like may be utilized. Further, in at least one of the various embodiments, the processes described in conjunction with FIGS. 6-10 may be used for secure communication sharing in accordance with at least one of the various embodiments and/or architectures such as those described in conjunction with FIGS. 4-5. Further, in at least one of the various embodiments, some or all of the action performed by processes 600, 700, 800, 900, and 1000 may be executed in part by network monitoring application 318, heuristic layout application 319, dashboard application 320, as well as, dashboard application 218.

Figure 6:
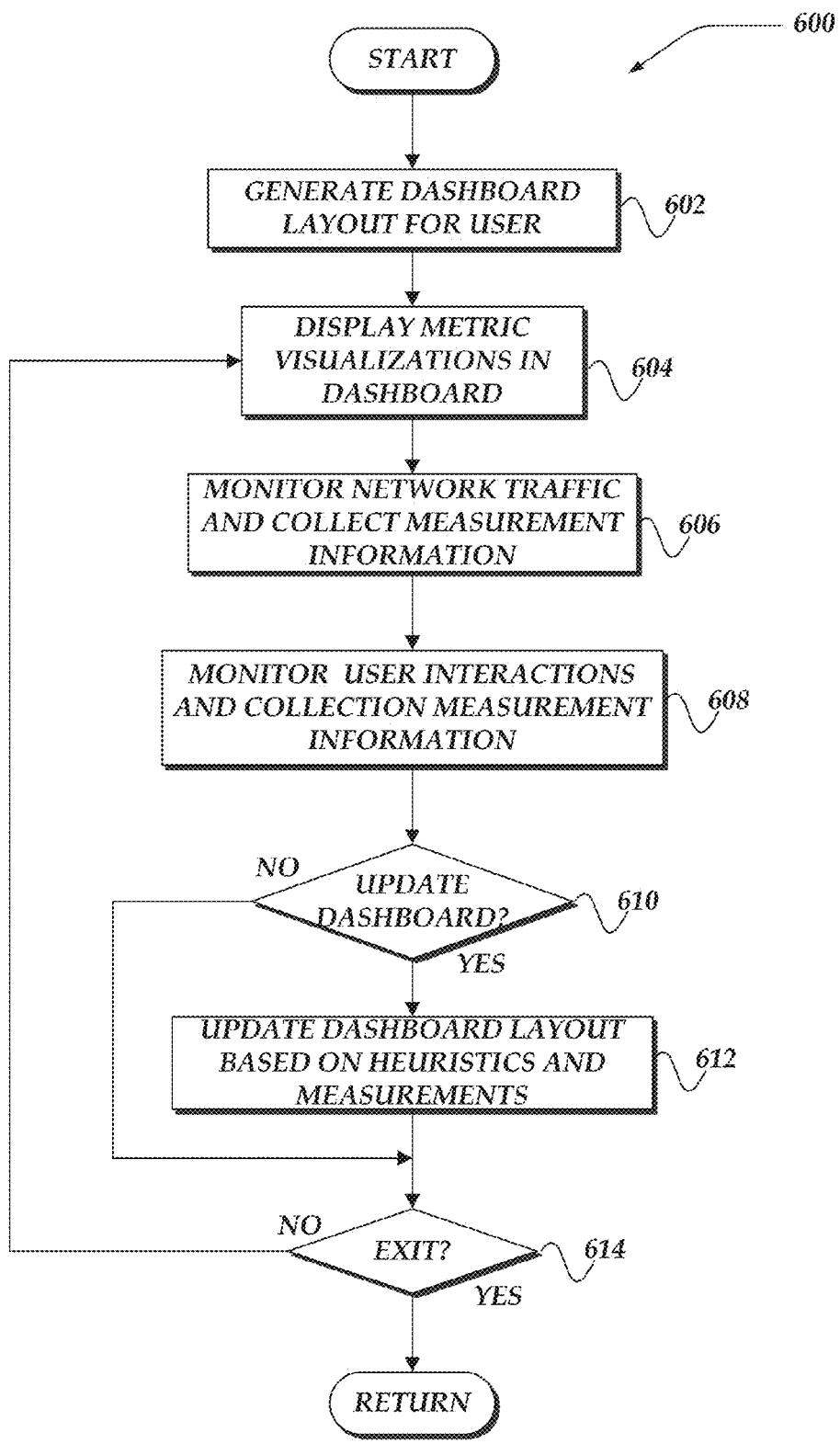
FIG. 6 illustrates an overview flowchart for a process that may be arranged to determine the layout of a procedurally generated user interface based on heuristics in accordance with at least one of the various embodiments.

FIG. 6 illustrates an overview flowchart of process 600 that may be arranged to determine the layout of a procedurally generated user interface based on heuristics in accordance with at least one of the various embodiments. After a start block, at block 602, in at least one of the various embodiments, an initial dashboard layout for a user may be generated. In at least one of the various embodiments, the dashboard layout may be based on layout information that may include a template that selects one or more visualizations of various metrics and determines their geometry/positioning information for display in the dashboard.

In at least one of the various embodiments, if the user is new to system, the dashboard layout may be based on a default layout that may be pre-configured. If the user is known to the system, the system retrieve layout information that may have been modified (customized) for the particular user.

Also, in at least one of the various embodiments, the dashboard layout information may be selected based on the role of the user, historical behavior or the user or other users, the type of network applications running in the network, or the like, or combination thereof. For example, in at least one of the various embodiments, if the user has manually configured a default dashboard layout, that information may be used by the layout engine to generate a dashboard layout.

In at least one of the various embodiments, generating a dashboard layout may include computing relevance score for one or more metrics based on one or more measurements. In other embodiments, the layout engine may assign metric visualization to positions in the dashboard based on other rule engines, neural networks, pre-defined placement/configuration information, or the like, rather than being limited to computing a relevance score. In at least one of the various embodiments, the layout engine may generate layout information that may be employed by a dashboard application to display one or more metric visualizations.

At block 604, in at least one of the various embodiments, one or more metric visualizations may be displayed in the dashboard based on layout information. In at least one of the various embodiments, layout information generated by a layout engine, such as, heuristics layout application 319, may be employed to select specific visualizations and metrics for display in a dashboard user-interface.

At block 606, in at least one of the various embodiments, network traffic for one or more networks may be monitored by a network monitoring device (NMD) to collect measurement information associated with various networking characteristics. In at least one of the various embodiments, some measurement information may form the basis of one or more metrics. In some embodiments, some measurement information may be used for determining the relevance and/or priority of one or more metrics. Thus, measurement information may be aggregated and/or transformed in to metrics and/or measurement information may be information that may be used to influence which metrics and/or metric visualizations are displayed in a dashboard.

In at least one of the various embodiments, collected measurement information may simply indicate the presence or observation of one or more patterns in the network traffic that indicate a particular protocol, application, transaction, malicious/disallowed activities, or the like, or combination thereof. Accordingly, in at least one of the various embodiments, measurement information may include whether one or more defined patterns was observed. For example, in some embodiments, measurement information may include an indication of the presence of one or more patterns, such as, network packet headers, protocol preambles, or the like.

At block 608, in at least one of the various embodiments, user interactions with the dashboard may be monitored to collect measurement information that represents user interaction with the system. In at least one of the various embodiments, monitored user interactions may include observing one or more users interacting with the dashboard as well as interaction with other part of the network and/or network monitoring system. User interaction measurement information may be applied as part of determining the relevance of one or more metrics and/or metric visualizations. For example, dashboard interactions may include one or more users hiding one or more metric visualizations which may indicate that the relevance that visualization metric may be reduced. Also, in at least one of the various embodiments, if users configure the NMD to set triggers and alarms for particular network events/traffic, metrics associated with these network events/traffic (if any) may have their relevance score increased accordingly.

At decision block 610, in at least one of the various embodiments, if the dashboard is ready to be updated, control may flow to block 612; otherwise, control may flow decision block 614. In at least one of the various embodiments, one or more measurements may indicate that the dashboard layout may need to be updated. For example, if one more measurements fall outside of expected ranges, exceed a defined threshold, or the like, a dashboard layout may be triggered. In some embodiments, a layout update may be triggered based on timeout period elapsing (e.g., every 5 minutes).

Also, in at least one of the various embodiments, updating of layout information for a dashboard may be triggered based on how one or more metrics relate to each, or at least based conditions that depend on one or more relationships between one or more metrics. In at least one of the various embodiments, the updating of the layout information may be triggered based on machine learning. Accordingly, in some embodiments, machine learning classifier may be trained to identify one or more conditions/network traffic patterns that may trigger an update of the layout information.

In at least one of the various embodiments, each of the one or more conditions used for determining if the layout information should be updated may be represented by one or more threshold values. In one or more embodiments, these threshold values, may be defined using real numbers, Boolean values, patterns, ranges, sets, strings, vectors, matrices, probabilities, or the like, or combination thereof.

At block 612, in at least one of the various embodiments, the layout information for the dashboard may be updated/modified based on the application of one or more test, rules, conditions, heuristics, or the like, or combination thereof. In at least one of the various embodiments, a layout application, such as, heuristic layout application 319 may be arranged to employ some or all of the measurement information to update the layout information for the dashboard. At decision block 614, in at least one of the various embodiments, if the process is directed to exit, control may be returned to a calling process otherwise; control may loop back to block 604. Accordingly, the dashboard may continue to be dynamically updated based on dynamically collected and/or realtime measurements and the heuristics.

Figure 7:
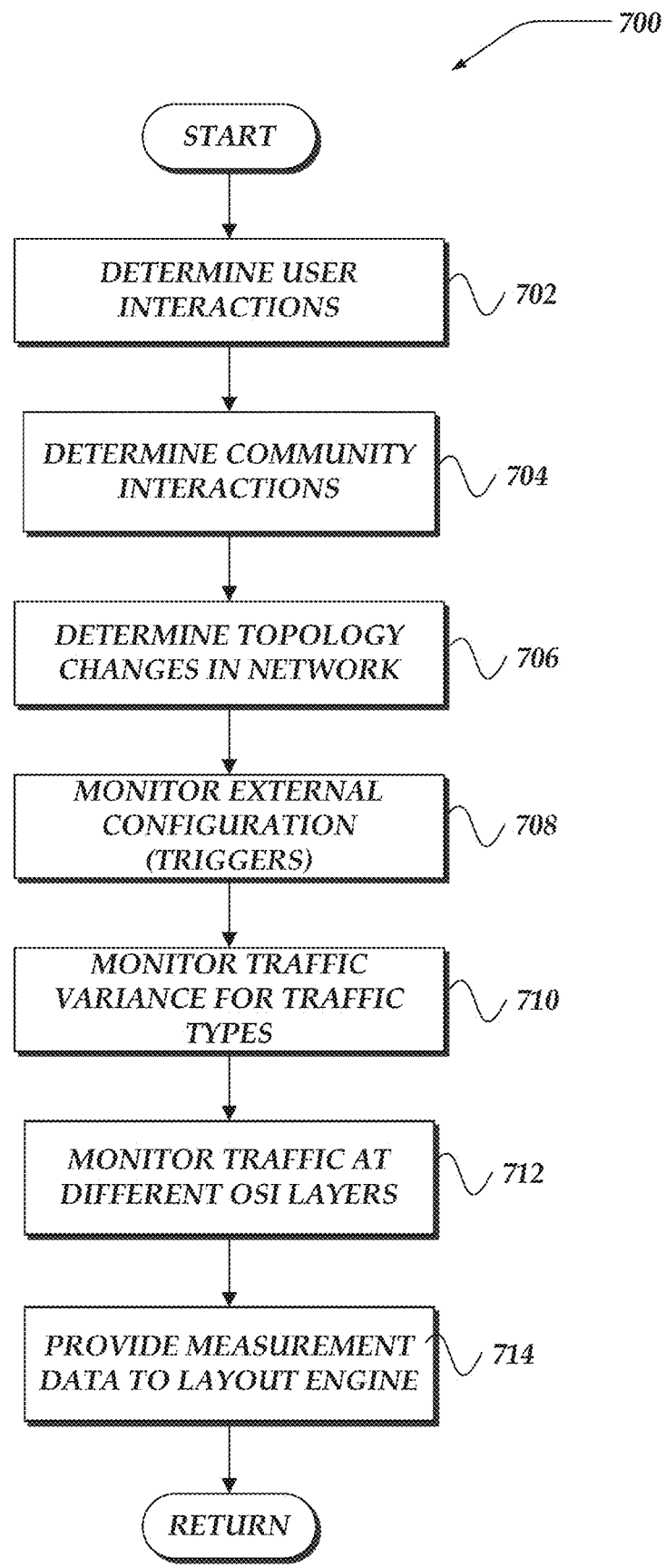
FIG. 7 illustrates a flowchart for a process for measurement information collection that may be used in heuristics for determining metric relevance and/or dashboard layouts in accordance with at least one of the various embodiments.

FIG. 7 illustrates a flowchart for process 700 for measurement information collection that may be used in heuristics for determining metric relevance and/or dashboard layouts in accordance with at least one of the various embodiments. Process 700 describes various representative mechanisms for collecting and/or generating measurement information that may be used by heuristics and other test for selecting and positioning one or more metrics and corresponding visualizations that may be included in a dashboard. One of ordinary skill in the art will appreciate that additional measurement information may be collected. However, a sufficient number of measurements are described herein to enable to one of ordinary skill in the art to understand and practice the innovations described herein. After a start block, at block 702, in at least one of the various embodiments, one or more user interactions may be determined and/or measured. In at least one of the various embodiments, user interactions with the dashboard may be measured by a dashboard application, such as, dashboard application 320 or dashboard application 218. These measurements may include tracking if users interact with metric visualization that are displayed in the dashboard.

In at least one of the various embodiments, such interactions may include if a user rearranges the layout of displayed visualizations; shows or hides visualizations, minimizes or expands visualizations, shares visualizations to other users (e.g., email, sharing a link, or the like), prints hardcopies of visualizations, or the like, or combination thereof.

In at least one of the various embodiments, user interactions with other parts of a network monitoring system may be collected and measured as well. In at least one of the various embodiments, a network monitoring device (NMD) may be arranged to enable users to configure one or more events, notifications, triggers, or the like, that may be associated with one or more network traffic characteristics detected/observed by the NMD. In some cases, one or more of these user configurations may be associated with one or more metrics. Accordingly, such information may be employed by one or more heuristic to help determine the relevancy of a given metric. For example, metrics associated with triggers, events, and so on, may have an increased relevancy than they would otherwise.

For example, if user configures the NMD to associate a notification trigger if the number of database connections exceeds a define threshold, the relevancy score of a metric, such as, number of database connections/hour may be increased.

In at least one of the various embodiments, these measurements may be used in one or more heuristics for determining the metrics and/or metric visualizations that should be displayed in a dashboard.

At block 704, in at least one of the various embodiments, one or more community interaction metrics may be collected and/or measured. In at least one of the various embodiments, user interactions of different users in the same organization may be measured and applied to determine the importance/relevancy of various metrics. In at least one of the various embodiments, if multiple users are similarly configuring their dashboards, this may indicate that the other users would appreciate similar changes. Also, the user changes may be categorized based on the role of the user. Thus, in at least one of the various embodiments, if users having the same role tend to arrange/configure their personal dashboard layout similarly, this may indicate relevance of metrics for other users of the same or even different roles.

Also, in at least one of the various embodiments, user interaction measurements may be accumulated across multiple separate entities. Such measurement information may be provided to layout application that may be hosted in a cloud based environment or other centrally accessible location. In at least one of the various embodiments, a layout application, such as, heuristic layout application 319 may apply user interaction measurement information from the other entities to determine relevancies for one or more metrics. In at least one of the various embodiments, this community interaction measurement information may be anonymized to protect the privacy of the separate entities.

At block 706, in at least one of the various embodiments, topology changes in the networks may be determined and/or measured. In at least one of the various embodiments, a network monitoring device (NMD) may be arranged to detect if the topology of the network changes. For example, a network monitoring device may be configured to detect if a previously unknown/unseen network computer has joined the network. The NMD may passively observe information in the network traffic that is associated with the new computer. Likewise, in at least one of the various embodiments, the NMD may observe if one or more computers leave the network, or otherwise stop providing network traffic. Also, in at least one of the various embodiments, the NMD may be configured to monitor the routes that network traffic takes through the network. Accordingly, the NMD may determine if routing table or other network configuration has occurred.

Further, in at least one of the various embodiments, the NMD may detect if a computer begins providing network traffic for different applications. For example, the NMD may measure that a computer is receiving a high volume of HTTP requests at TCP/IP port 80 and providing HTTP responses. Accordingly, in this example, the computer may be determined to be hosting a web server. If, for example, the NMD detects that the computer stops communication using HTTP over port 80 and begins communicating using Simple Mail Transfer Protocol (SMTP) over port 25, the NMD may determine that the computer may have been re-provisioned to host an email server.

In any event, in at least one of the various embodiments, a layout application, such as, heuristic layout application 319 may be arranged to apply one or more measurements related to changes in the network topology to determine relevancy of metrics.

At block 708, in at least one of the various embodiments, external configuration information may be analyzed and/or measured. In at least one of the various embodiments, external configuration information is considered configuration information that is separate from configuration information used for directly configuring a dashboard, For example, external configuration information may be related to configuring the operation of the NMD rather than configuring a dashboard.

In at least one of the various embodiments, the NMD may be arranged to trigger various operations depending on the occurrence of one or more configured conditions. For example, a NMD may be configured to generate an alarm/notification if a number of HTTP 404 (documents not found) events exceeds a threshold. In some embodiments this type of external configuration information may be provided to the heuristic layout application. Accordingly, in this example, the layout application may increase the relevance to HTTP metrics since the user has expressed an interest by way of the external configurations.

In any event, in at least one of the various embodiments, a layout application, such as, heuristic layout application 319 may be arranged to apply one or more measurements related to changes in the external configuration information to determine relevancy of metrics.

At block 710, in at least one of the various embodiments, variance information may be determined for one or more components of the network traffic may be measured. In at least one of the various embodiments, a layout application may be arranged to measure the rate-of-change for various network characteristics. For example, the rate-of-changes may be employed as a "velocity" that may be used for predicting behavior of the network traffic.

Also, in at least one of the various embodiments, the layout application may measure the changes in proportion of a type of network traffic. For example, if HTTP traffic comprises 10% of the network traffic and then it changes to 40% of the network traffic, the heuristic layout application may determine that HTTP related metrics may be have an increased relevancy since the HTTP traffic has increased significantly.

At block 712, in at least one of the various embodiments, one or more characteristic of network traffic associated with different Open System Interconnection (OSI) layers may be measured. Accordingly, in at least one of the various embodiments, if the measurement information may be provided to one or more heuristics, the heuristics may generate one or more correlations based on the information from the different layers.

At block 714, in at least one of the various embodiments, the measurement data and/or determined information may be provided to a dashboard layout application such as heuristic layout application 319. In at least one of the various embodiments, additional measurement information may be integrated into the layout application than those described above.

In at least one of the various embodiments, additional (not described above) measurements may include input from one or more environmental sensors, such as, GPS/geolocation, geolocation data derived from an IP-to-location database, geolocation data provided manually via user input and/or configuration, electric current, voltage, environmental temperature, device temperatures, time-of-day, time-of-years, or the like, or combination thereof. Further, in at least one of the various embodiments, the layout application may be arranged to accept one or more customized plugin/modules that include instructions for collecting additional measurements. Next, control may be returned to a calling process.

Figure 8:
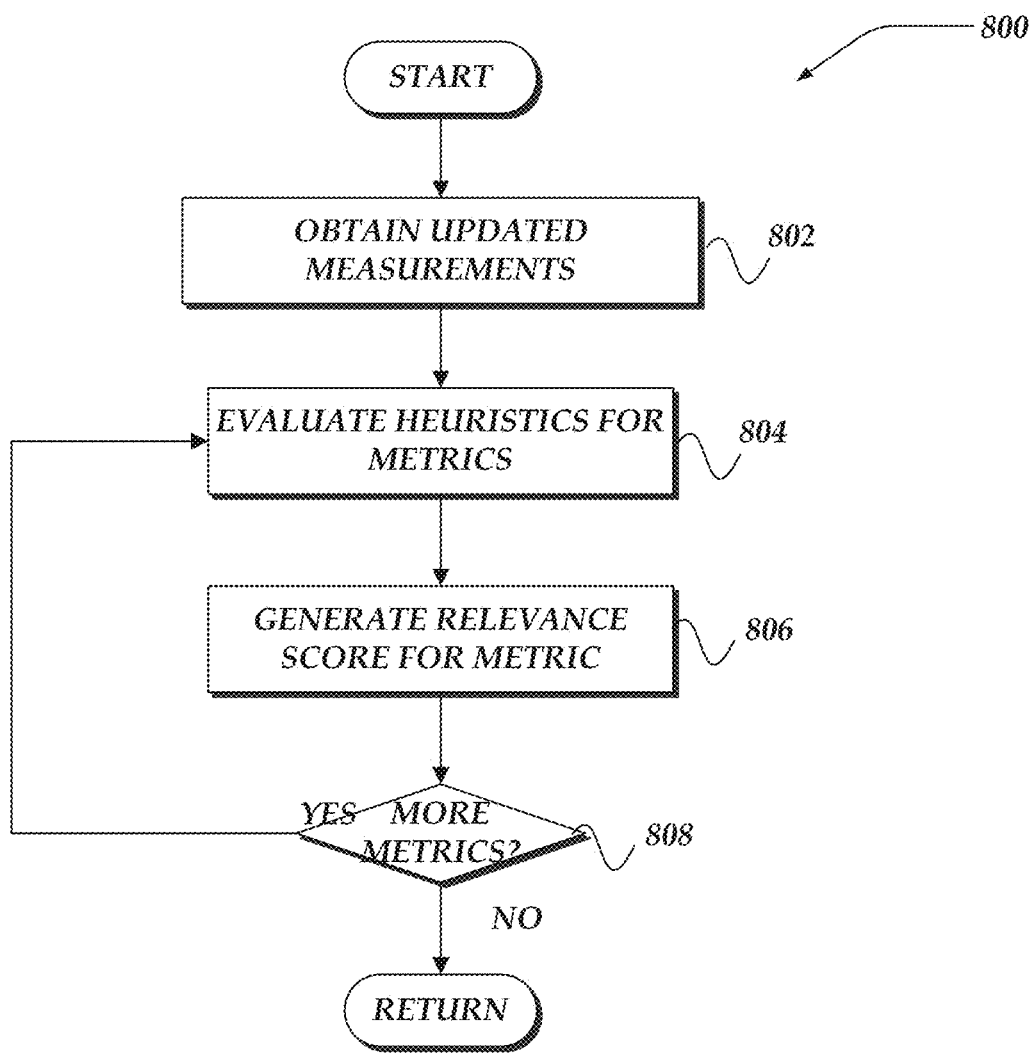
FIG. 8 illustrates a flowchart for a process for generating a relevance score for one or more metrics in accordance with at least one of the various embodiments.

FIG. 8 illustrates a flowchart for process 8 for generating a relevance score for one or more metrics in accordance with at least one of the various embodiments. After a start block at block 802, updated measurement data may be obtained.

At block 804, in at least one of the various embodiments, one or more heuristics may be evaluated for each metric. In at least one of the various embodiments, one or more metrics may be predefined. In some embodiments, a list of well-known and/or common network traffic metrics may be available. In some embodiments, a network monitoring device may be arranged to produce metrics associated with one or more popular network/application protocols, such as, HTTP, HTTPS, TLS/SSL, UDP, TCP/IP, or the like. Accordingly, in at least one of the various embodiments, NMD's may be configured to generate metrics, such as, number of connections, requests, responses, network traffic quantities, or the like, for the one or more popular protocols. Also, in at least one of the various embodiments, the NMD may be arranged to generate one or more custom metrics based on configuring the NMD to track/count various events/patterns observed in the monitored network traffic.

In at least one of the various embodiments, one or more heuristics may be associated with each metric. The heuristics may be executed to evaluate the relevancy of a given metric for a given user.

Alternatively, in at least one of the various embodiments, one or more heuristics may be evaluated to determine which metrics are relevant. Accordingly, in some embodiments, one or more heuristics may be arranged to apply the provided measurements to determine which metrics are relevant. In this arrangement a given heuristic may produce a result that one or more particular metrics should be considered for display on the dashboard.

At block 806, in at least one of the various embodiments, relevance scores may be generated for the determined one or more metrics. In at least one of the various embodiments, various mechanisms for determining a relevance value for a metric may be employed. In at least one of the various embodiments, results of the heuristics may be normalized and arranged into vectors that may be later provided to a rules engine or a neural network for evaluation. In at least one of the various embodiments, heuristics may be implemented using rules or scripts implements in one or more computer programming languages.

At decision block 808, in at least one of the various embodiments, if there are more metrics and/or heuristics to evaluate, control may loop back to block 804; otherwise, control may be returned to a calling process. In at least one of the various embodiments, the network monitoring application may be arranged to continuously update the one or more measurements. Accordingly, in at least one of the various embodiments, the relevancy scores/information for the metrics may be likewise continuously updated. Relevancy information for the metrics may be updated for metrics that are displayed in the dashboard as well as those that are not displayed on the dashboard. Thus, in at least one of the various embodiments, as relevancy information changes the particular metric visualizations displayed on the dashboard may also change.

Figure 9:
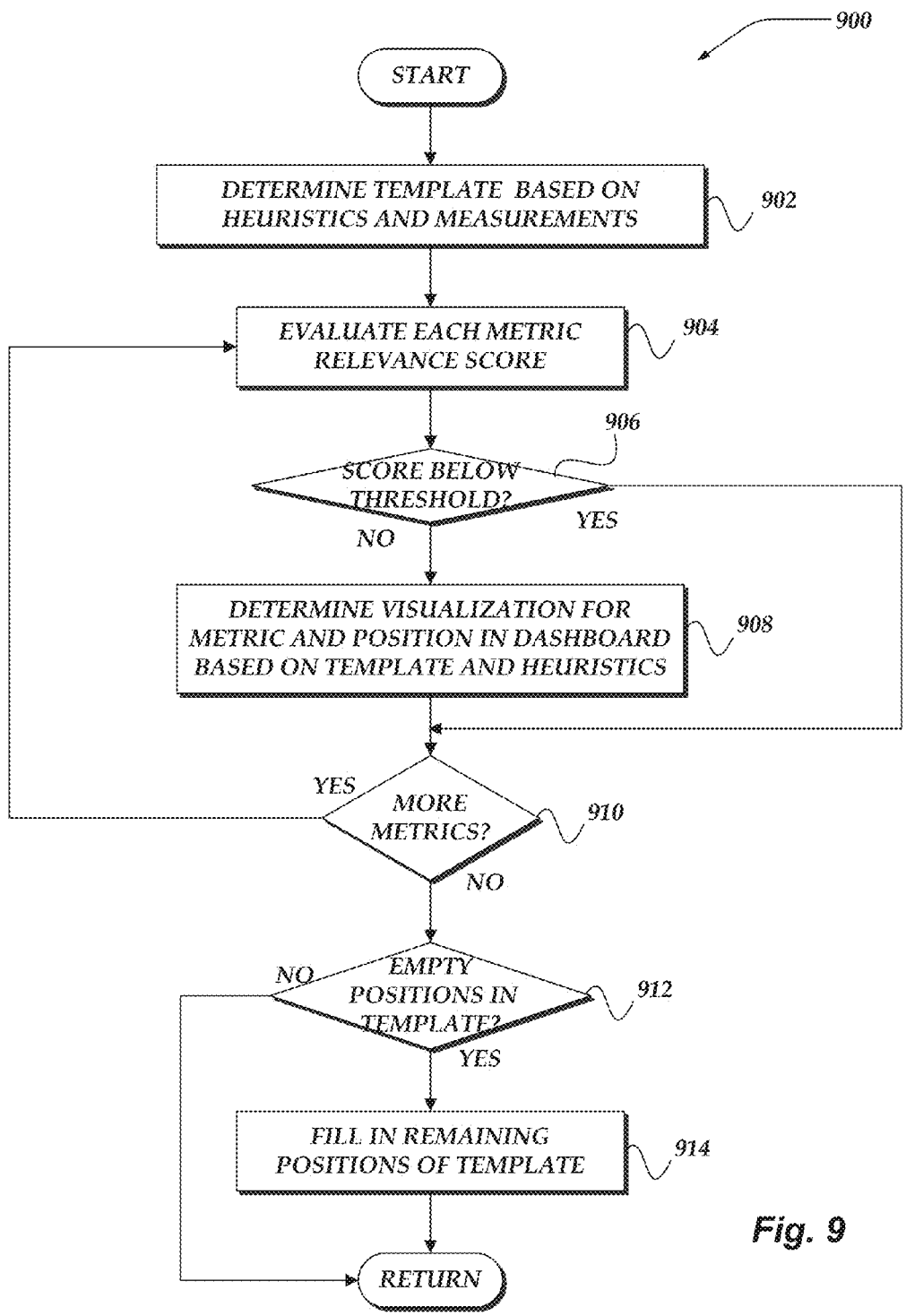
FIG. 9 illustrates a flowchart for a process for dynamic layout of metric visualization in accordance with at least one of the various embodiments.

FIG. 9 illustrates a flowchart for process 900 for dynamic layout of metric visualization in accordance with at least one of the various embodiments. After a start block, at block 902, a template for the dashboard may be determined based on one or more heuristics and/or measurement data. In at least one of the various embodiments, local and community measurements may be employed by heuristics to the determine dashboard layout template. In other embodiments, the dashboard template may be retrieved from configuration information associated with the particular user.

At block 904, in at least one of the various embodiments, the relevance score for each metric may be evaluated. In at least one of the various embodiments, the layout application may provide a list of metrics each that may have a computer relevancy score or other type of weighting information that may be used to rank order/prioritize the metrics.

At decision block 906, in at least one of the various embodiments, if the relevance score may be below a defined threshold, control may flow to decision block 910; otherwise, control may flow to block 908. In at least one of the various embodiments, one or more metrics deemed to have relevancy below a threshold may be ignored for now.

At block 908, in at least one of the various embodiments, a particular visualization for the metric and a position in for displaying it in the dashboard may be determined based on the template and/or one or more heuristics. In at least one of the various embodiments, in some cases a metric may be associated with one or more different visualizations. In some embodiments, metrics may be visualized using line graphs, pie charts, bar graphs, scatter plots, heat maps, Sankey diagrams, histograms, time series graphs, candlestick charts, geolocation charts, or the like, or combination thereof.

In at least one of the various embodiments, a layout application, such as, heuristic layout application 319 may be arranged to execute one or more heuristics to associate a particular visualization with a particular metrics. Also, in at least one of the various embodiments, user preferences and/or other configuration may supersede the heuristics. Also, in at least one of the various embodiments, layout information associated with the dashboard template may drive which visualization may be used for a given metric.

In at least one of the various embodiments, once the visualization is determined, the layout application may determine a position in the dashboard to the display the metric visualization. In some embodiments, the template may include rank ordered locations, such that, the most relevant metric visualization may be positioned at the highest ranked position, the next highest relevant metric visualization may be positioned at the next highest ranked position, and so on.

At decision block 910, in at least one of the various embodiments, if there are more metrics to process, control may loop back to block 904; otherwise, control may flow to decision block 912.

At decision block 912, in at least one of the various embodiments, if there are empty/unassigned positions in the dashboard template, control may flow to block 914; otherwise control may be returned to a calling process.

At block 914, in at least one of the various embodiments, unassigned positions in the template may be filled using visualizations for one or more metrics. In at least one of the various embodiments, the unassigned metric visualizations may be placed in the dashboard based on their relative relevancy/relevancy scores. Next, control may flow to a calling process.

Figure 10:
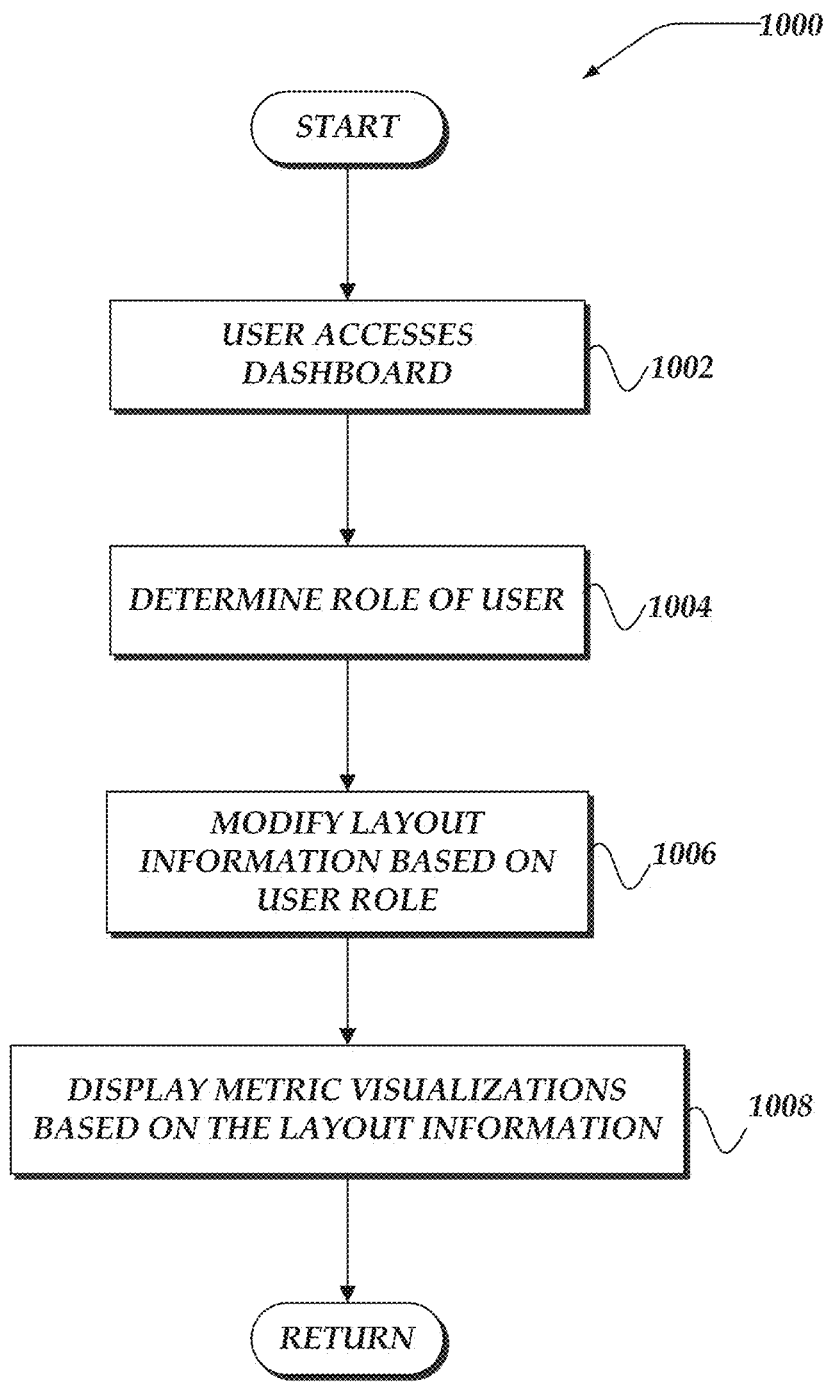
FIG. 10 illustrates a flowchart for a process for determining a dashboard layout based on a user in accordance with at least one of the various embodiments.

FIG. 10 illustrates a flowchart for process 1000 for determining a dashboard layout based on a user in accordance with at least one of the various embodiments. After a start block, at block 1002, in at least one of the various embodiments, a user may access a dashboard. In at least one of the various embodiments, users may access a dashboard from a client computer or network computer. In at least one of the various embodiments, one or more well-known methods may be employed to ascertain the identity of the user, such as, login name and password, mobile telephone number, or the like, combination thereof.

At block 1004, in at least one of the various embodiments, the role of the user may be determined. In at least one of the various embodiments, users may be assigned various roles that may reflect their role in an organization, such as, guest, administrator, security administrator, customer service, network operations, executive, sales, marketing, or the like. Roles may influence the type and format of metric information that may be of interest and/or accessible to a user. For example, customer service users may want to have a dashboard to include metric visualizations that enable them to be response to customer service call (e.g., is the network down?). Whereas, a security administrator may be better server with a dashboard that includes metrics associated with network security, such as, intrusion attempts, failed login attempts, or the like.

At block 1006, in at least one of the various embodiments, the dashboard layout information may be modified based the role of the user. In at least one of the various embodiments, a layout application may be arranged to execute one or more heuristics that may determine one or more modification and/or adjustment to the layout information for a dashboard. For example, if the user is a network security administrator, a heuristic may examine measurement information related to email server login attempts, if the number of failures exceeds a defined threshold, the heuristic may be arranged to increase the relevancy of metrics associated with email. At block 1008, in at least one of the various embodiments, one or more metric visualizations may be displayed in the dashboard based on the layout information. Next, control may be returned to another process.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware based systems, which perform the specified actions or steps, or combinations of special purpose hardware and computer instructions. The foregoing example should not be construed as limiting and/or exhaustive, but rather, an illustrative use case to show an implementation of at least one of the various embodiments of the invention.

The above specification, examples, and data provide a complete description of the composition, manufacture, and use of the invention. Since many embodiments of the invention can be made without departing from the spirit and scope of the invention, the invention resides in the claims hereinafter appended.

What is claimed as new and desired to be protected by Letters Patent of the United States is:

1. A method for monitoring communication over a network with a network monitoring device (NMD) that performs actions, comprising:
   generating measurement information based on network traffic that is monitored by the NMD;
   generating one or more metrics based on the measurement information, wherein the one or more metrics are associated with one or more characteristics of the monitored network traffic;

generating layout information for a user-interface based on one or more results of one or more heuristics, wherein the one or more results of the one or more heuristics are based in part on the measurement information;

providing one or more ranked positions in the user-interface to display one or more metric visualizations, wherein a rank for each of the one or more ranked positions is based on one or more of the measurement information or the one or more heuristics;

displaying the one or more metric visualizations in the user-interface based on the layout information that includes geometry information for the one or more ranked positions, wherein the one or more metric visualizations are associated with the one or more metrics; and when one or more portions of the measurement information exceed one or more defined threshold values, performing further actions, including:

modifying the layout information based on the one or more portions of the measurement information and one or more other results of the one or more heuristics; and modifying the display of the one or more metric visualizations based on the modified layout information.

2. The method of claim 1, further comprising:

modifying the measurement information to include one or more other characteristics of the network traffic, wherein the one or more other characteristics are associated with different Open Systems Interconnection (OSI) layers of the network traffic;

providing the modified measurement information to the one or more heuristics, wherein the one or more heuristics generate one or more correlations between different OSI layers based on the one or more other characteristics; and updating the one or more results of the one or more heuristics based on the one or more correlations.

3. The method of claim 1, wherein the measurement information, further comprises, user interactions with the user-interface, wherein the user interactions include one or more of rearranging the layout of the one or more metric visualizations, hiding the one or more metric visualizations from view, sharing the one or more metric visualizations with other users, or printing hardcopies of the one or more metric visualizations.

4. The method of claim 1, wherein the measurement information, further comprises, one or more changes in a topology of the network, wherein changes in the topology of the network include one or more of one or more computers being added to the network, one or more computers leaving the network, or alterations to the network's routing information.

5. The method of claim 1, wherein the one or more results of the one or more heuristics are generated by one or more of an expert system, a rules engine, a neural network, a deep learning neural network, a computer program, or configuration information.

6. The method of claim 1, further comprising, determining a position in the user interface for the one or more metric visualizations based on at least one of a relevancy score or a weight, wherein the relevancy score is determined in part by the one or more results of the one or more heuristics.

7. The method of claim 1, wherein generating the layout information further comprises, determining a layout template based on the one or more results of the one or more heuristics and the measurement information.

8. The method of claim 1, wherein generating the layout information further comprises employing geo-location information that is provided to the one or more heuristics.

9. A system for monitoring communication over a network, comprising:

a network monitoring device (NMD), comprising:
a transceiver that communicates over the network;
a memory that stores at least instructions; and
a processor device that executes instructions that perform actions, including:
generating measurement information based on network traffic that is monitored by the NMD;
generating one or more metrics based on the measurement information, wherein the one or more metrics are associated with one or more characteristics of the monitored network traffic;
generating layout information for a user-interface based on one or more results of one or more heuristics, wherein the one or more results of the one or more heuristics are based in part on the measurement information;
providing one or more ranked positions in the user-interface to display one or more metric visualizations, wherein a rank for each of the one or more ranked positions is based on one or more of the measurement information or the one or more heuristics;
displaying the one or more metric visualizations in the user-interface based on the layout information that includes geometry information for the one or more ranked positions, wherein the one or more metric visualizations are associated with the one or more metrics; and
when one or more portions of the measurement information exceed one or more defined threshold values, performing further actions, including:
modifying the layout information based on the one or more portions of the measurement information and one or more other results of the one or more heuristics; and
modifying the display of the one or more metric visualizations based on the modified layout information; and a client computer, comprising:
a transceiver that communicates over the network;
a memory that stores at least instructions; and
a processor device that executes instructions that perform actions, including:
displaying the user interface that includes the one or more metric visualizations.

10. The system of claim 9, wherein the NMD processor device executes instructions that perform actions, further comprising:

modifying the measurement information to include one or more other characteristics of the network traffic, wherein the one or more other characteristics are associated with different Open Systems Interconnection (OSI) layers of the network traffic;

providing the modified measurement information to the one or more heuristics, wherein the one or more heuristics generate one or more correlations between different OSI layers based on the one or more other characteristics; and updating the one or more results of the one or more heuristics based on the one or more correlations.

11. The system of claim 9, wherein the measurement information, further comprises, user interactions with the user-interface, wherein the user interactions include one or more of rearranging the layout of the one or more metric visualizations, hiding the one or more metric visualizations from view, sharing the one or more metric visualizations with other users, or printing hardcopies of the one or more metric visualizations.

12. The system of claim 9, wherein the measurement information, further comprises, one or more changes in a topology of the network, wherein changes in the topology of the network include one or more of one or more computers being added to the network, one or more computers leaving the network, or alterations to the network's routing information.

13. The system of claim 9, wherein the one or more results of the one or more heuristics are generated by one or more of an expert system, a rules engine, a neural network, a deep learning neural network, a computer program, or configuration information.

14. The system of claim 9, wherein the NMD processor device executes instructions that perform actions, further comprising, determining a position in the user interface for the one or more metric visualizations based on at least one of a relevancy score or a weight, wherein the relevancy score is determined in part by the one or more results of the one or more heuristics.

15. The system of claim 9, wherein generating the layout information further comprises, determining a layout template based on the one or more results of the one or more heuristics and the measurement information.

16. The system of claim 9, wherein generating the layout information further comprises employing geo-location information that is provided to the one or more heuristics.

17. A processor readable non-transitory storage media that includes instructions for monitoring communication over a network, wherein execution of the instructions by a processor device performs actions, comprising:
   generating measurement information based on network traffic that is monitored by a NMD;
   generating one or more metrics based on the measurement information, wherein the one or more metrics are associated with one or more characteristics of the monitored network traffic;
   generating layout information for a user-interface based on one or more results of one or more heuristics, wherein the one or more results of the one or more heuristics are based in part on the measurement information;
   providing one or more ranked positions in the user-interface to display one or more metric visualizations, wherein a rank for each of the one or more ranked positions is based on one or more of the measurement information or the one or more heuristics;
   displaying the one or more metric visualizations in the user-interface based on the layout information that includes geometry information for the one or more ranked positions, wherein the one or more metric visualizations are associated with the one or more metrics; and
   when one or more portions of the measurement information exceed one or more defined threshold values, performing further actions, including:
      modifying the layout information based on the one or more portions of the measurement information and one or more other results of the one or more heuristics; and
      modifying the display of the one or more metric visualizations based on the modified layout information.

18. The media of claim 17, further comprising:
   modifying the measurement information to include one or more other characteristics of the network traffic, wherein the one or more other characteristics are associated with different Open Systems Interconnection (OSI) layers of the network traffic;
   providing the modified measurement information to the one or more heuristics, wherein the one or more heuristics generate one or more correlations between different OSI layers based on the one or more other characteristics; and
   updating the one or more results of the one or more heuristics based on the one or more correlations.

19. The media of claim 17, wherein the measurement information, further comprises, user interactions with the user-interface, wherein the user interactions include one or more of rearranging the layout of the one or more metric visualizations, hiding the one or more metric visualizations from view, sharing the one or more metric visualizations with other users, or printing hardcopies of the one or more metric visualizations.

20. The media of claim 17, wherein the measurement information, further comprises, one or more changes in a topology of the network, wherein changes in the topology of the network include one or more of one or more computers being added to the network, one or more computers leaving the network, or alterations to the network's routing information.

21. The media of claim 17, wherein the one or more results of the one or more heuristics are generated by one or more of an expert system, a rules engine, a neural network, a deep learning neural network, a computer program, or configuration information.

22. The media of claim 17, further comprising, determining a position in the user interface for the one or more metric visualizations based on at least one of a relevancy score or a weight, wherein the relevancy score is determined in part by the one or more results of the one or more heuristics.

23. The media of claim 17, wherein generating the layout information further comprises employing geo-location information that is provided to the one or more heuristics.

24. A network computer for monitoring communication over a network, comprising:
   a transceiver that communicates over the network;
   a memory that stores at least instructions; and
   a processor device that executes instructions that perform actions, including:
      generating measurement information based on network traffic that is monitored by the network computer;
      generating one or more metrics based on the measurement information, wherein the one or more metrics are associated with one or more characteristics of the monitored network traffic;
      generating layout information for a user-interface based on one or more results of one or more heuristics, wherein the one or more results of the one or more heuristics are based in part on the measurement information;
      providing one or more ranked positions in the user-interface to display one or more metric visualizations, wherein a rank for each of the one or more ranked positions is based on one or more of the measurement information or the one or more heuristics;
      displaying the one or more metric visualizations in the user-interface based on the layout information that includes geometry information for the one or more ranked positions, wherein the one or more metric visualizations are associated with the one or more metrics; and when one or more portions of the measurement information exceed one or more defined threshold values, performing further actions, including:

modifying the layout information based on the one or more portions of the measurement information and one or more other results of the one or more heuristics; and modifying the display of the one or more metric visualizations based on the modified layout information.

25. The network computer of claim 24, wherein the processor device executes instructions that perform actions, further comprising:

modifying the measurement information to include one or more other characteristics of the network traffic, wherein the one or more other characteristics are associated with different Open Systems Interconnection (OSI) layers of the network traffic;

providing the modified measurement information to the one or more heuristics, wherein the one or more heuristics generate one or more correlations between different OSI layers based on the one or more other characteristics; and updating the one or more results of the one or more heuristics based on the one or more correlations.

26. The network computer of claim 24, wherein the measurement information, further comprises, user interactions with the user-interface, wherein the user interactions include one or more of rearranging the layout of the one or more metric visualizations, hiding the one or more metric visualizations from view, sharing the one or more metric visualizations with other users, or printing hardcopies of the one or more metric visualizations.

27. The network computer of claim 24, wherein the measurement information, further comprises, one or more changes in a topology of the network, wherein changes in the topology of the network include one or more of one or more computers being added to the network, one or more computers leaving the network, or alterations to the network's routing information.

28. The network computer of claim 24, wherein the one or more results of the one or more heuristics are generated by one or more of an expert system, a rules engine, a neural network, a deep learning neural network, a computer program, or configuration information.

29. The network computer of claim 24, wherein the processor device executes instructions that perform actions, further comprising, determining a position in the user interface for the one or more metric visualizations based on at least one of a relevancy score or a weight, wherein the relevancy score is determined in part by the one or more results of the one or more heuristics.

30. The network computer of claim 24, wherein generating the layout information further comprises employing geo-location information that is provided to the one or more heuristics.

\* \* \* \* \*